United States Patent
Jiang et al.

(10) Patent No.: US 11,251,920 B2
(45) Date of Patent: Feb. 15, 2022

(54) METHODS AND APPARATUSES FOR TRANSMITTING AND RECEIVING REFERENCE SIGNALS

(71) Applicant: NEC CORPORATION, Tokyo (JP)

(72) Inventors: Chuangxin Jiang, Beijing (CN); Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/985,303

(22) Filed: Aug. 5, 2020

(65) Prior Publication Data

US 2020/0366437 A1 Nov. 19, 2020

Related U.S. Application Data

(63) Continuation of application No. 16/085,832, filed as application No. PCT/CN2016/077831 on Mar. 30, 2016, now Pat. No. 10,764,008.

(51) Int. Cl.
*H04L 12/28* (2006.01)
*H04L 5/00* (2006.01)

(52) U.S. Cl.
CPC .......... *H04L 5/0048* (2013.01); *H04L 5/0007* (2013.01); *H04L 5/0026* (2013.01); *H04L 5/0053* (2013.01); *H04L 5/0073* (2013.01)

(58) Field of Classification Search
None
See application file for complete search history.

(56) References Cited

U.S. PATENT DOCUMENTS

| | | |
|---|---|---|
| 2010/0120442 A1 | 5/2010 | Zhuang et al. |
| 2010/0284351 A1 | 11/2010 | Liang et al. |
| 2011/0292847 A1 | 12/2011 | Yoon et al. |
| 2012/0208547 A1 | 8/2012 | Geirhofer et al. |
| 2013/0142156 A1 | 6/2013 | Mazzarese et al. |
| 2013/0208645 A1 | 8/2013 | Feng et al. |
| 2013/0242904 A1 | 9/2013 | Sartori et al. |

(Continued)

FOREIGN PATENT DOCUMENTS

| | | |
|---|---|---|
| EP | 2 378 703 A1 | 10/2011 |
| EP | 2849481 A1 | 3/2015 |

(Continued)

OTHER PUBLICATIONS

Communication dated Mar. 17, 2020, from the Japanese Patent Office in Application No. 2018-568472.

(Continued)

*Primary Examiner* — Elisabeth Benoit Magloire
(74) *Attorney, Agent, or Firm* — Sughrue Mion, PLLC

(57) ABSTRACT

Embodiments of the present disclosure relate to methods and apparatuses for transmitting and receiving reference signals. In transmitting reference signals, reference signals are transmitted using a first group of configuration resources within a first transmission resource group; and the reference signals are transmitted using a second group of configuration resources within a second transmission resource group. The first group of configuration resources are determined based on allocated resource configurations for the reference signals and the second group of configuration resources are a subset of the first group of configuration resources.

18 Claims, 25 Drawing Sheets

(56) References Cited

U.S. PATENT DOCUMENTS

| | | | |
|---|---|---|---|
| 2015/0244508 A1 | 8/2015 | Kim et al. | |
| 2015/0264718 A1 | 9/2015 | Yu et al. | |
| 2015/0365154 A1* | 12/2015 | Davydov | H04B 7/0632 370/329 |
| 2016/0006553 A1* | 1/2016 | Kim | H04L 1/1861 370/252 |
| 2016/0050153 A1 | 2/2016 | Xu et al. | |
| 2016/0112173 A1* | 4/2016 | Wang | H04L 5/0053 370/329 |
| 2016/0142189 A1* | 5/2016 | Shin | H04L 5/0048 370/329 |
| 2016/0248562 A1* | 8/2016 | Nam | H04L 5/0051 |
| 2016/0337874 A1* | 11/2016 | Yang | H04B 7/0478 |
| 2016/0359660 A1 | 12/2016 | Blankenship et al. | |
| 2017/0251466 A1 | 8/2017 | Astely et al. | |
| 2018/0013529 A1 | 1/2018 | You et al. | |
| 2018/0206073 A1 | 7/2018 | Wang et al. | |

FOREIGN PATENT DOCUMENTS

| | | |
|---|---|---|
| EP | 2947935 A1 | 11/2015 |
| JP | 2015070335 A | 4/2015 |
| JP | 2015518671 A | 7/2015 |
| JP | 2015-536099 A | 12/2015 |
| WO | 2014110837 A1 | 7/2014 |
| WO | 2014/166052 A1 | 10/2014 |
| WO | 2016/013882 A1 | 1/2016 |

OTHER PUBLICATIONS

Extended European Search Report dated Sep. 24, 2019 issued by the European Patent Office in counterpart application No. 16895889.0.

International Search Report of PCT/CN2016/077831 filed Mar. 30, 2016.

Notification of Reasons for Refusal dated Sep. 3, 2019 issued by the Japanese Patent Office in counterpart application No. 2018-568472.

3GPP TS 36.211, "Technical Specification Group Radio Access Network; Evolved Universal Terrestrial Radio Access (E-UTRA);Physical channels and modulation (Release 13)", 3rd Generation Partnership Project; V13.0.0, Dec. 2015, (142 Pages Total).

Decision to Grant a Patent dated Sep. 28, 2021 from the Japanese Patent Office in Japanese Application No. 2020-101470.

NEC, "Design for Non-precoded CSI-RS for overhead reduction", 3GPP TSG RAN WG1 Meeting #85, R1-164481, 2016 (4 pages total).

* cited by examiner

Table 6.10.5.2-0: The sequence $w_{p'}(i)$ for CDM4.

| $p'$ | | $[w_{p'}(0) \quad w_{p'}(1) \quad w_{p'}(2) \quad w_{p'}(3)]$ |
|---|---|---|
| $N_{ports}^{CSI}=4$ | $N_{ports}^{CSI}=8$ | |
| 15 | 15,17 | $[1 \quad 1 \quad 1 \quad 1]$ |
| 16 | 16,18 | $[1 \quad -1 \quad 1 \quad -1]$ |
| 17 | 19,21 | $[1 \quad 1 \quad -1 \quad -1]$ |
| 18 | 20,22 | $[1 \quad -1 \quad -1 \quad 1]$ |

Sub-array 1　　Sub-array 2
for PRB group 1 for PRB group 2

Sub-array 1　　　Sub-array 2
for PRB group 1　for PRB group 2

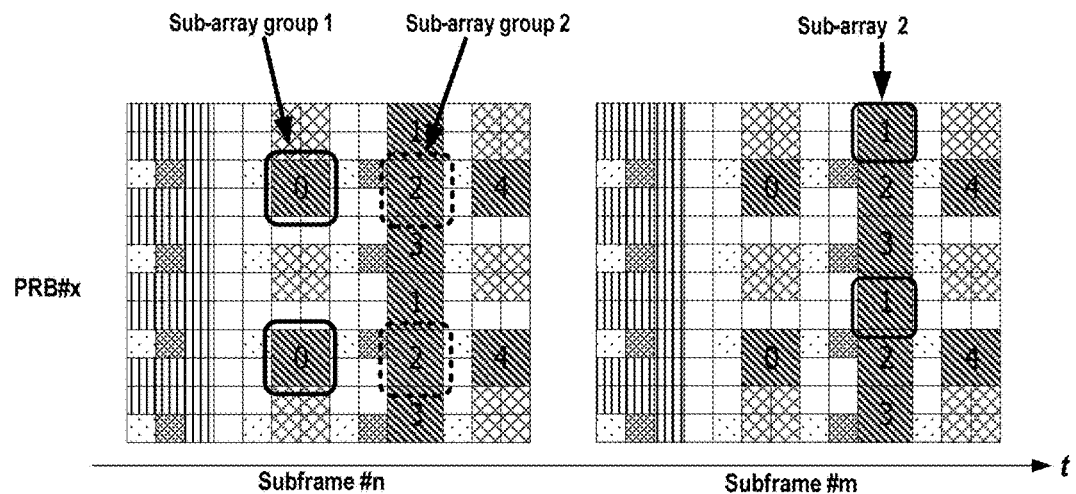
Fig. 42
$$\begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & 1 & 1 & -1 & -1 \\ 1 & 1 & -1 & -1 & -1 & -1 & 1 & 1 \\ 1 & -1 & 1 & -1 & 1 & -1 & 1 & -1 \\ 1 & -1 & 1 & -1 & -1 & 1 & -1 & 1 \\ 1 & -1 & -1 & 1 & 1 & -1 & -1 & 1 \\ 1 & -1 & -1 & 1 & -1 & 1 & 1 & -1 \end{bmatrix}$$
Fig. 43
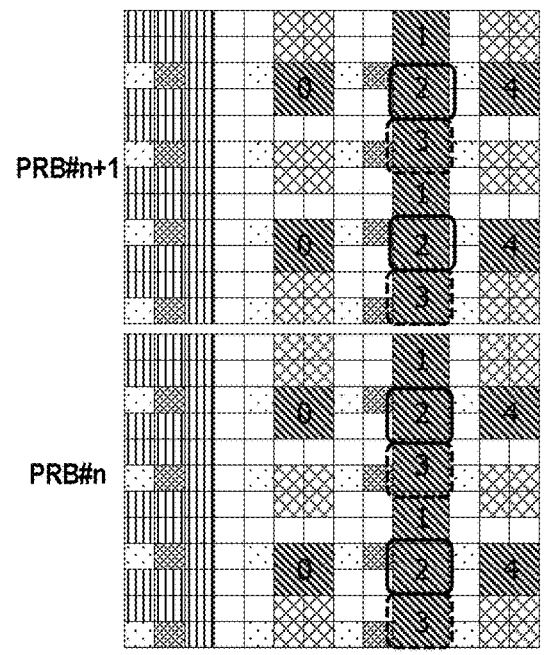
Fig. 44

$$\begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & 1 & 1 & -1 & -1 \\ 1 & 1 & -1 & -1 & -1 & -1 & 1 & 1 \\ 1 & -1 & 1 & -1 & 1 & -1 & 1 & -1 \\ 1 & -1 & 1 & -1 & -1 & 1 & -1 & 1 \\ 1 & -1 & -1 & 1 & 1 & -1 & -1 & 1 \\ 1 & -1 & -1 & 1 & -1 & 1 & 1 & -1 \end{bmatrix} \begin{matrix} \text{First part} \\ \\ \\ \\ \text{Second part} \\ \\ \\ \end{matrix}$$

$$\begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & 1 & 1 & -1 & -1 \\ 1 & 1 & -1 & -1 & -1 & -1 & 1 & 1 \\ 1 & -1 & 1 & -1 & 1 & -1 & 1 & -1 \\ 1 & -1 & 1 & -1 & -1 & 1 & -1 & 1 \\ 1 & -1 & -1 & 1 & 1 & -1 & -1 & 1 \\ 1 & -1 & -1 & 1 & -1 & 1 & 1 & -1 \end{bmatrix}$$

$$\begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & 1 & 1 & -1 & -1 \\ 1 & 1 & -1 & -1 & -1 & -1 & 1 & 1 \\ 1 & -1 & 1 & -1 & 1 & -1 & 1 & -1 \\ 1 & -1 & 1 & -1 & -1 & 1 & -1 & 1 \\ 1 & -1 & -1 & 1 & 1 & -1 & -1 & 1 \\ 1 & -1 & -1 & 1 & -1 & 1 & 1 & -1 \end{bmatrix}$$

$$\begin{bmatrix} 1 \\ 1 \\ 1 \\ 1 \\ -1 \\ -1 \\ -1 \\ -1 \end{bmatrix} * e^{j\theta}$$

Fig. 51

METHODS AND APPARATUSES FOR TRANSMITTING AND RECEIVING REFERENCE SIGNALS

CROSS-REFERENCE TO RELATED APPLICATIONS

This application is a Continuation of U.S. application Ser. No. 16/085,832 filed Sep. 17, 2018, which is a National Stage of International Application No. PCT/CN2016/077831 filed Mar. 30, 2016, the contents of all of which are incorporated herein by reference in their entirety.

FIELD OF THE PRESENT DISCLOSURE

Embodiments of the present disclosure generally relate to wireless communication techniques and more particularly relate to a method and apparatus for transmitting reference signals and a method and apparatus for receiving reference signals.

BACKGROUND OF THE PRESENT DISCLOSURE

Multi-antenna techniques can significantly increase data rates and reliability of a wireless communication system. The performance can be in particular improved if both the transmitter and the receiver are equipped with multiple antennas, which results in a multiple-input multiple-output (MIMO) communication channel. Such systems and/or related techniques are commonly referred to as MIMO.

The Long Term Evolution (LTE) standard is currently evolving with enhanced MIMO support. A core component in LTE is support of MIMO antenna deployments and MIMO related techniques. Currently one-dimensional (horizontal) antenna array can provide flexible beam adaption in the azimuth domain only through the horizontal precoding process, while fixed down-tilt is applied in the vertical direction.

With the development of the Active Antenna Array (ASS), a full dimensional MIMO (FD-MIMO) was proposed since it was found that a full MIMO capability can be exploited through leveraging two-dimensional (2D) antenna planar such that the user-specific elevation beamforming and spatial multiplexing on the vertical domain are possible.

In LTE Rel. 13, for FD-MIMO, Channel State Information Reference Signals (CSI-RS) ports for 2D antenna arrays were increased to 12/16 for Class A CSI-RS (i.e., non-precoded CSI-RS), and antenna configurations (N1, N2)= (2,3), (3,2), (2,4), or (4,2) were used and both Code Division Multiplexing (CDM)-2 and CDM-4 were adopted for Class A CSI-RS. Moreover, technologies for further FD-MIMO enhancement are also required to be studied. For non-precoded CSI-RS enhancement, it was already proposed to extend the existing numbers {1, 2, 4, 8, 12, 16} of CSI-RS antenna ports for support of {20, 24, 28, 32} CSI-RS ports with mechanism for reducing the overhead for CSI-RS transmission.

In 36.211 d00 of Rel. 13 Agreements in RAN1 #84, there are described patterns for 12-port and 16-port CSI-RS. Regarding 16-port CSI-RS Resource Element (RE) mapping for CDM-4, an antenna configuration (N, K)=(8, 2) is used; 8 REs for mapping a legacy 8-port CSI-RS are partitioned into two groups of 4 REs; and each group of 4 REs forms a CDM group and antenna port numbering and Orthogonal Cover Code (OCC) allocation are defined in Table 1

TABLE 1

Antenna Port Numbering and OCC Allocations (16-port CSI-RS RE mapping for CDM-4)

| CSI-RS ports | OCC indices | RE locations |
|---|---|---|
| 15, 16, 19, 20 | 0, 1, 2, 3 | RE locations for antenna ports {15, 16, 19, 20} for the first 8-port resource |
| 17, 18, 21, 22 | 0, 1, 2, 3 | RE locations for antenna ports {17, 18, 21, 22} for the first 8-port resource |
| 23, 24, 27, 28 | 0, 1, 2, 3 | RE locations for antenna ports {15, 16, 19, 20} for the second 8-port resource |
| 25, 26, 29, 30 | 0, 1, 2, 3 | RE locations for antenna ports {17, 18, 21, 22} for the second 8-port resource |

FIG. 1 illustrates the CSI-RS pattern for 16-port CSI-RS RE mapping for CDM-4, wherein a CDM group comprises 4 RE and two CDM group forms 8 REs for mapping a legacy 8-port CSI-RS as illustrated by bold line blocks in FIG. 1.

Regarding 12-port CSI-RS-RE for CDM-4, an antenna configuration (N,K) (4,3) is used; 4 REs for mapping legacy 4-port CSI-RS comprise a CDM group and antenna port numbering and OCC allocation is defined in Table 2.

TABLE 2

Antenna Port Numbering and OCC Allocations (12-port CSI-RS RE mapping for CDM-4)

| CSI-RS ports | OCC indices | RE locations |
|---|---|---|
| 15, 16, 17, 18 | 0, 1, 2, 3 | 4 REs corresponding to the 1st resource |
| 19, 20, 21, 22 | 0, 1, 2, 3 | 4 REs corresponding to the 2nd resource |
| 23, 24, 25, 26 | 0, 1, 2, 3 | 4 REs corresponding to the 3rd resource |
| 27, 28, 29, 30 | 0, 1, 2, 3 | 4 REs corresponding to the 4th resource |

FIG. 2 illustrates the CSI-RS pattern for 12-port CSI-RS RE mapping for CDM-4, wherein a CDM group comprises 4 REs but these 4 REs are two separate groups of REs as illustrated by bold line blocks in FIG. 2. In addition, FIG. 3 illustrate the sequence $w_p(i)$ for CDM-4, which is an OCC sequence with a length of 4.

For CDM-2, in 36.211 d00 of the Rel. 13 Agreements, Class A CSI-RS resource port numbers used for the k-th component resources with Rel-12 port number p' are given as follows:

$$p^{(k)} = \begin{cases} p' + \frac{N}{2}k, & p' = 15, 16, \ldots, 14 + \frac{N}{2} \\ p' + \frac{N}{2}(k + K - 1), & p' = 15 + \frac{N}{2}, \ldots, 14 + N \end{cases}$$

wherein k indicates the index of the component resources, p' indicates the Rel-12 port number, N indicates the number of ports in each component resource and K indicates the number of component resources. FIG. 4 illustrates CSI-RS pattern for 16-port CSI-RS RE mapping for CDM-2, which comprises two 8-port configurations.

In addition, it was further proposed to using CSI-RS of 0.5 RE/RB/port in RAN1 #82. In the proposed scheme, not all the CSI-RS ports are located within a signal PRB but ports are multiplexed in adjacent PRB in FDM manner. In the case of normal CP 16, the CST-RS ports include frame structure types 1 and 2 each comprising 8 CSI-RS ports. The first 8 CSI-RS ports (i.e. ports 15-22) are located in the even-numbered PRBs and the second 8 CSI-RS ports (i.e. ports 23-30) are located in odd-numbered PRBs.

SUMMARY OF THE PRESENT DISCLOSURE

In the above-mentioned solution, there is only provided CSI-RS designs for up to 16 ports and it fails to provide how to extend more ports. Thus, in the art, a new CSI-RS port design and new reference signal transmission and receiving solutions are needed so as to meet requirements of CSI-RS port increase.

To this end, in the present disclosure, there is provided a new solution for reference signals transmission and receiving to mitigate or at least alleviate at least part of the issues in the prior art.

According to a first aspect of the present disclosure, there is provided a method for transmitting reference signals. The method comprises: transmitting the reference signals using a first group of configuration resources within a first transmission resource group; and transmitting the reference signals using a second group of configuration resources within a second transmission resource group. Particularly, the first group of configuration resources are determined based on allocated resource configurations for the reference signals and the second group of configuration resources are a subset of the first group of configuration resources.

In a second aspect of the present disclosure, there is provided a method of receiving reference signals, comprising receiving the reference signals in a first group of configuration resources within a first transmission resource group; and receiving the reference signals in a second group of configuration resources within a second transmission resource group. Particularly, the first group of configuration resources are determined based on allocated resource configurations for the reference signals and the second group of configuration resources are a subset of the first group of configuration resources.

In a third aspect of the present disclosure, there is also provided an apparatus for transmitting reference signals. The apparatus comprises: a first reference signal transmission unit, configured to transmit the reference signals using a first group of configuration resources within a first transmission resource group; and a second reference signal transmission unit, configured to transmit the reference signals using a second group of configuration resources within a second transmission resource group. Particularly, the first group of configuration resources are determined based on allocated resource configurations for the reference signals and the second group of configuration resources are a subset of the first group of configuration resources In a fourth aspect of the present disclosure, there is provided an apparatus for receiving reference signals. The apparatus comprises: a first reference signal receiving unit, configured to receive the reference signals in a first group of configuration resources within a first transmission resource group; and a second reference signal receiving unit, configured to receive the reference signals in a second group of configuration resources within a second transmission resource group. Particularly, the first group of configuration resources are determined based on allocated resource configurations for the reference signals and the second group of configuration resources are a subset of the first group of configuration resources.

According to a fifth aspect of the present disclosure, there is also provided a computer-readable storage media with computer program code embodied thereon, the computer program code configured to, when executed, cause an apparatus to perform actions in the method according to any embodiment in the first aspect.

According to a sixth aspect of the present disclosure, there is further provided a computer-readable storage media with computer program code embodied thereon, the computer program code configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

With embodiments of the present disclosure, it may support more ports for reference signals such as CSI-RS, and the legacy CSI-RS resource configuration mechanism can be reused and at the same time the RRC signal overhead, standard complexity and impact on the legacy UE can be reduce substantially.

Other features and advantages of the embodiments of the present invention will also be apparent from the following description of specific embodiments when read in conjunction with the accompanying drawings, which illustrate, by way of example, the principles of embodiments of the present disclosure.

BRIEF DESCRIPTION OF THE DRAWINGS

Embodiments of the present disclosure are presented in the sense of examples and their advantages are explained in greater detail below, with reference to the accompanying drawings, where

FIG. 42 illustrates sub-array group and sub-array mapping in TDM mode in accordance with embodiments of the present disclosure;

FIG. 43 illustrates an example of Orthogonal Variable Spreading Factor for OCC in accordance with embodiments of the present disclosure;

FIG. 44 illustrates a scheme for CDM 8 for 32 CSI-RS ports in FDM mode in accordance with embodiments of the present disclosure;

FIG. 50 illustrates a composite channel for legacy UE in in accordance with embodiments of the present disclosure;

FIG. 51 illustrates another example of Orthogonal Variable Spreading Factor for OCC in accordance with embodiments of the present disclosure;

DETAILED DESCRIPTION OF EMBODIMENTS

Figure 1:
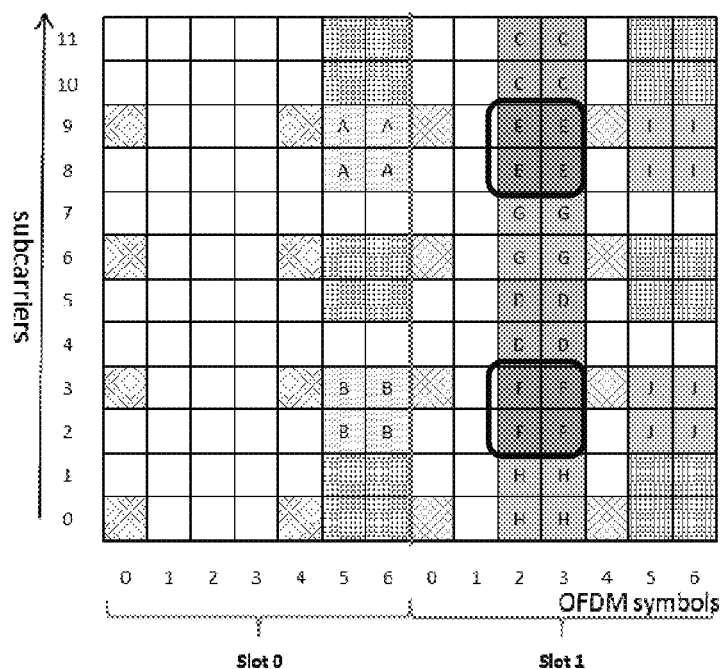
FIG. 1 illustrates the CSI-RS pattern for 16-port CSI-RS RE mapping for CDM-4 in 36.211 d00 of Rel. 13 Agreements in RAN1 #84.
Figure 2:
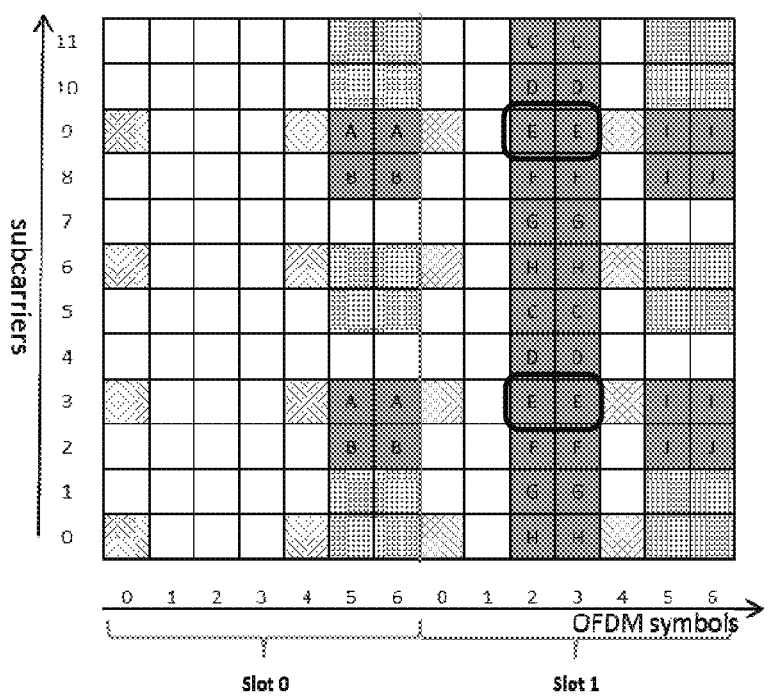
FIG. 2 illustrates the CSI-RS pattern for 12-port CSI-RS RE mapping for CDM-4 in 36.211 d00 of Rel. 13 Agreements in RAN1 #84.
Figures 3, 4:
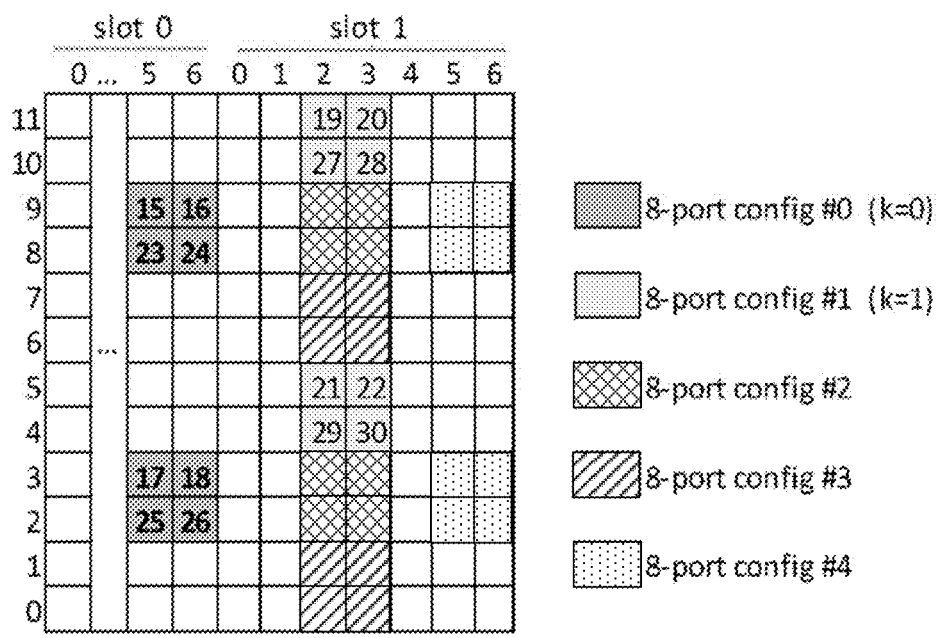
FIG. 3 illustrate the sequence $w_p(i)$ for CDM-4 in 36.211 d00 of Rel. 13 Agreements in RAN1 #84.
FIG. 4 illustrates CSI-RS pattern for 16-port CST-RS RE mapping for CDM-2 in 36.211 d00 of Rel. 13 Agreements in RAN1 #84.

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included. Furthermore, in the context of the present disclosure, the term "BS" may represent, e.g., a node B (NodeB or NB), an evolved NodeB (eNodeB or eNB), a radio header (RH), a remote radio head (RRH), a relay, or a low power node such as a femto, a pico, and so on.

As described hereinbefore, in the existing solution, there is only provided CSI-RS design for up to 16 ports and it fails to provide how to extend more ports. Thus, embodiments of the present disclosure are directed to a new CSI-RS design and a new solution for reference signal transmission and receiving. The solution can be performed between a serving node like eNB and a terminal device like UE, so as to support reference signal transmission with more ports. Particularly, the transmission resources are divided into at least two groups, i.e., a first group of configuration resources and the second group of configuration resources. Reference signals for the UE are transmitted jointly using configuration resource groups within the first and second transmission resource groups so as to support more ports and particularly, the first transmission resource group can be determined based resource configurations allocated for the reference signals while the second transmission resource groups can be a subset of the first group of configuration resources. The configuration resource group for the first transmission resource group and the second transmission resource group can be indicated to the UE by one or more indications. An antenna array for transmitting reference signals can be divided into a first sub-array and a second sub-array which can be mapped to the first transmission resource group and the second transmission resource group respectively; and preferable in at least one of a first sub-array and a second array, the sub-array can be further divided into a plurality of sub-array groups which can be mapped to different resource configurations in respective transmission resource group. A high order OCC can be used to support CDM-8 and the OCC can comprise a part containing legacy OCC sequences which can be used to multiplex configuration resources which can be used by legacy users. By this means, it is possible to support more CSI-RS ports using, for example, legacy CSI-RS resource configurations and at the same time, it is possible to reduce the RRC signal overhead, operation complexities and impact on legacy UEs.

In some embodiments of the present disclosure, the terminal device may comprise UE, such as a terminal, an MT, an SS, a PSS, an MS, or an AT. Meanwhile, the serving node may comprise a BS, such as a node B (NodeB or NB), or an evolved NodeB (eNodeB or eNB).

In other embodiments of the present invention may be applied in various communication systems, including but not limited to a Long Term Evolution (LTE) system or a Long Term Evolution Advanced (LTE-A) system. Given the rapid development in communications, there will also be future type wireless communication technologies and systems with which the present invention may be embodied without any doubts. Thus, it should not be appreciated as limiting the scope of the present disclosure to only the aforementioned system.

Hereinafter, some exemplary embodiments of the present invention will be described below with reference to FIGS. 5 to 54 in details. However, it shall be appreciated that these exemplary embodiments are presented only for purposes of illustration and the present disclosure is not limited to specific details described with reference to the exemplary embodiments. For example, CSI-RS will be mainly taken as an example of reference signals as recited herein and in face the present disclosure is not limited thereto.

Figure 5:
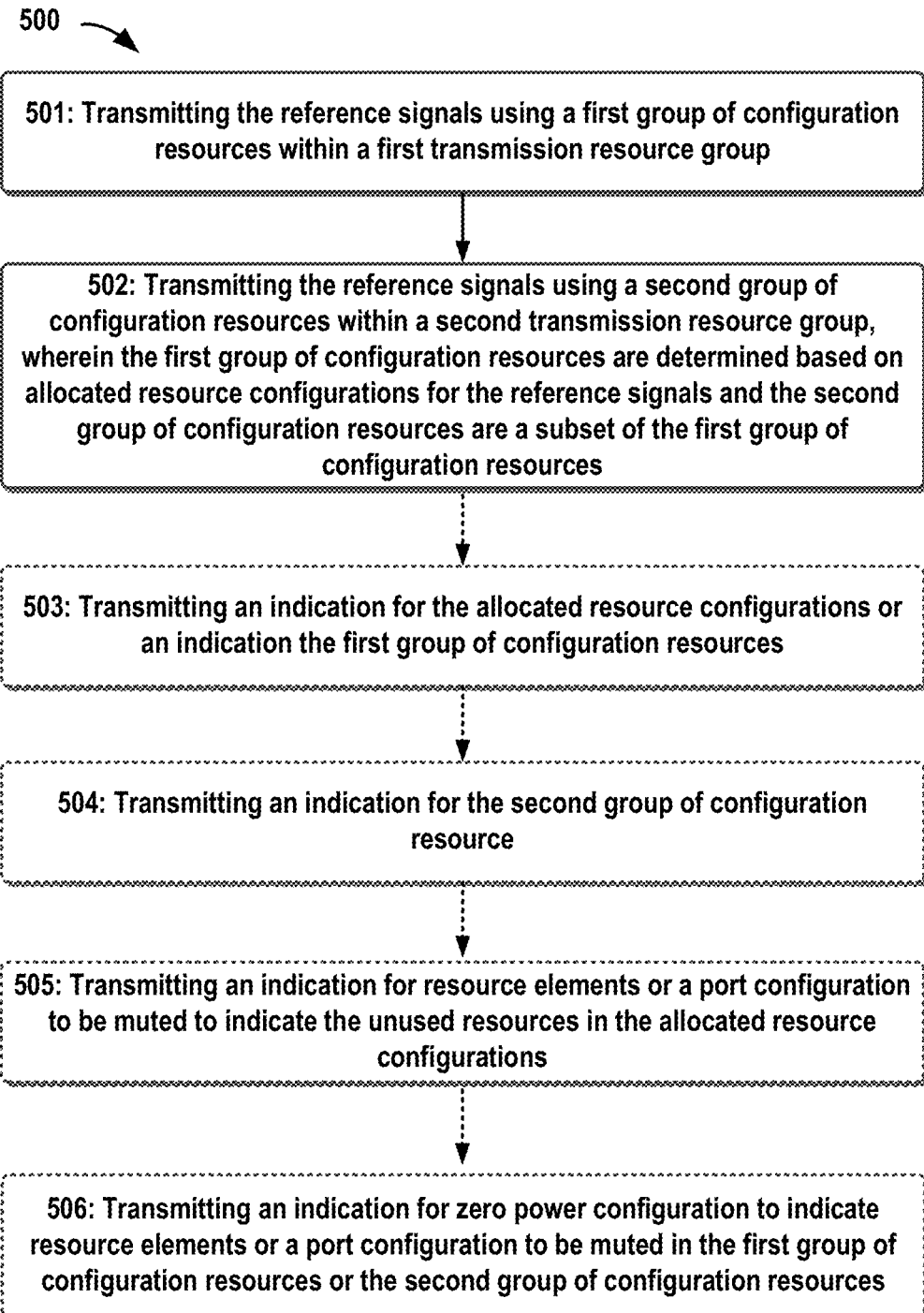
FIG. 5 schematically illustrates a flow chart of a method for transmitting reference signals according to an embodiment of the present disclosure.

Reference will be first made to FIG. 5, which schematically illustrates a flow chart of a method 500 for transmitting reference signals in accordance with an embodiment of the present disclosure. The method 500 can be performed at a serving node, for example a BS, like a node B (NodeB or NB), As illustrated in FIG. 5, the method 500 starts from step 501, in which, the reference signals are transmitted using a first group of configuration resources within a first transmission resource group and in step 502, reference signals are transmitted in the second group of configuration resource within a second transmission resource group. The first group of configuration resources are determined based on allocated resource configurations for the reference signals and the second group of configuration resources are a subset of the first group of configuration resources.

As already mentioned hereinabove, in the present disclosure, the transmission resources are divided into at least two groups, i.e., the first group of configuration resources and the second group of configuration resources. The term "transmission resource" used herein means the time-frequency resources for signal transmission. In a Frequency Division Multiplex (FDM) mode, the transmission resources mean Physical Resource Blocks (PRBs); in a Time Division Multiplexing (TDM) mode, the transmission resources mean specific PRBs in subframes. In the FDM mode, the PRBs in one subframe can be divided into at least two transmission resource groups, for example, those even-numbered PRBs and those odd-numbered PRBs. One of the first transmission resource group and the second transmission resource group contains odd-numbered PRBs and the other of them contains even-numbered PRBs. In the TDM mode, the first transmission resource group and the second transmission resource group are in different subframes. In each of the transmission resource groups, not all REs are configured for a predetermined reference signal transmission, some REs are used to transmit data, some REs are used to transmit control information, some REs are used to transmit Common Reference Signal (CRS), some REs are used to transmit Demodulation Reference signal (DMRS) and some RES are used to transmit CSI-RS signals. In an embodiment wherein the reference signal is CSI-RS, those REs for CSI-RS within a transmission resource group are called a group of configuration resources. It is noted that PRB or PRB pair in this embodiment means one Physical Resource Block in one subframe.

Figure 6:
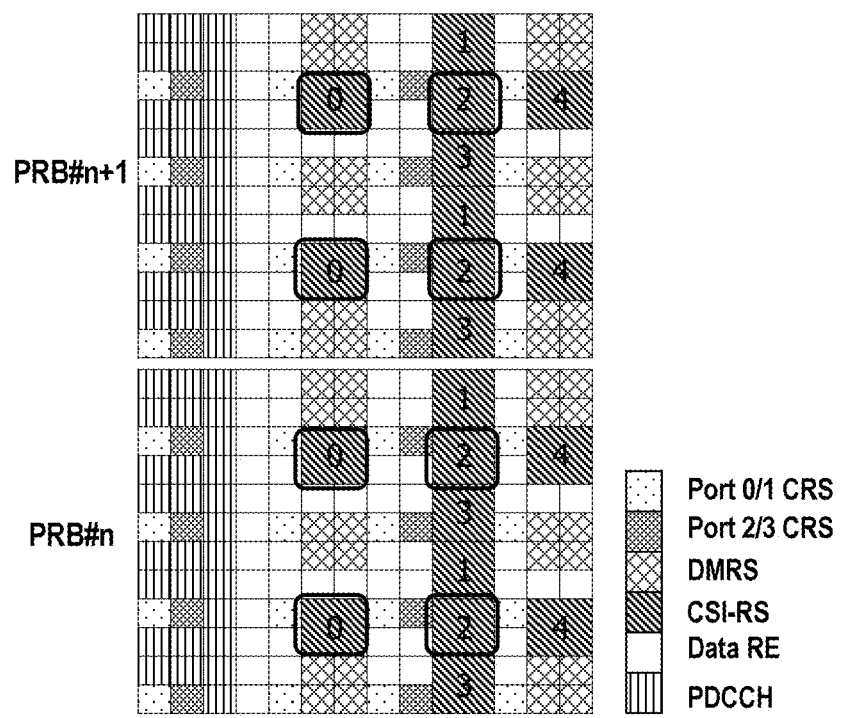
FIG. 6 schematically illustrates a CSI-RS port resource allocation scheme for 28 or 32 CSI-RS ports in FDM mode in accordance with embodiments of the present disclosure.

For a purpose of illustration, FIGS. 6 to 11 illustrate example transmission resource group division and CSI-RS port resource allocation schemes in FDM mode in accordance with embodiments of the present disclosure. As illustrated in FIG. 6, for 28 CSI-RS ports, PRB #n for example belongs to the first transmission resource group while PRB #n+1 belongs to the second transmission resource group.

However, it should be noted that it is also possible that PRB #n+1 belongs to the first transmission resource group while PRB #n belongs to the second transmission resource group. Hereinafter, for a purpose of illustration, reference will be made to an example that the first transmission resource group contains PRB #n while the second transmission resource group contains PRB #n+1.

For PRB #n, a 16-port CSI-RS resource A1 can be configured to UE, based on a legacy configuration mechanism such as Rel-13 configuration mechanism and two 8-port CSI-RS configuration resources are configured to the UE, for example, A1=Config.0+Config.2 as illustrated in FIG. 6 by bold line blocks. For PRB #n+1, a 16-port CSI-RS resource A2 which is exactly same with A1 can be configured to the UE, that is to say A1=A2. In this case, the number of real CSI-RS antenna ports for 28 CSI-RS ports is 28, while the allocated CSR-RS resources contain two 8-port CSI-RS configurations in each PRB pair, i.e. 32 REs in the adjacent PRB pairs. Thus, the allocated CSI-RS resource REs are more than the real CSI-RS antenna ports. Therefore, all REs in A1 can be used but four REs in A2 can be unused resources and they can be muted so that their power can be lent to other REs to perform power boosting, thereby tackling power boosting issues. At the same time, the mute REs cannot be used transmitted Data. In such a case, the first group of configuration resources (16 ports, i.e., N1) are used within the first transmission resource group while the second group of configuration resources (12(16−4) ports, i.e., N2) are used within the second transmission resource group. In other word, in this case, A1(16)=A2(16), N1(16)=A1(16), and N2(12)<A2(16) and thus N2 is a subset of N1, i.e., N2<N1.

Referring back to FIG. 5, As illustrated in FIG. 5, in step 503, the eNB can send an indication to the UE to inform the allocated resource configurations A1 since A1=A2, eNB can only configure the UE with one indication for the A1 and A2 since A1=A2. And the UE may determine the first group of configuration resources (N1) and the second group of configuration resources (N2) based on A1 and predetermined resource allocation polices which specifies those REs unused in N1 or N2 and are known by both the cNB and UE.

In addition, it is also possible for the cNB to send an indication for the first group of configuration resources (N1) and the UE may determine the second group of configuration resources (N2) based on the first group of configuration resources (N1) and the predetermined resource allocation polices which are known by both the eNB and UE. Moreover, for REs to be muted, they can also be informed to the UE by an indication like an RRC signaling in step 505, or the four REs can be default information between the eNB and UE and in such a case no RCC signaling is required. For four REs in A2 to be mute, one CDM4 group or one 4-port CSI-RS configuration can be mute as the similar way in the description of FIGS. 8 and 9. Or alternatively, in addition to the indication for the first group of configuration resources N1, the eNB can further send an indication for the second group of configuration resources N2 to the UE directly in step 504. In such a case, resource to be muted can be determined based on the first group of configuration resources N1 and the second group of configuration resources N2, and thus no RRC signaling or default signaling are required.

For 32 CSI-RS ports, the same two 8-port CSI-RS configurations can be configured for PRB #n and PRB #n+1 and in such a case, A1(16)=A2(16), N1(16)=A1(16), N2(16)=A2(16) and no muting is required.

Figure 7:
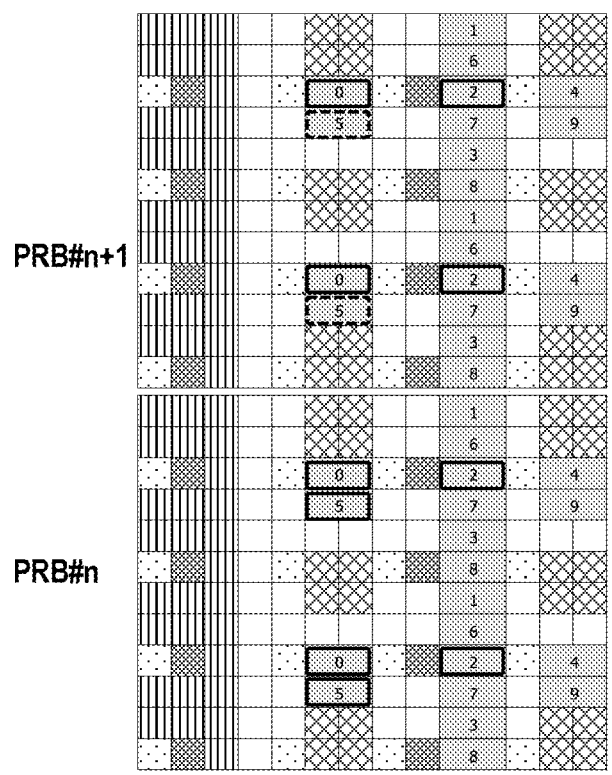
FIG. 7 schematically illustrates a CSI-RS port resource allocation scheme for 20 or 24 CSI-RS ports in FDM mode in accordance with embodiments of the present disclosure.

FIG. 7 illustrates a CSI-RS port resource allocation scheme for 20 CSI-RS ports in accordance with embodiments of the present disclosure. As illustrated in FIG. 7, the transmission resources are divided in a similar way, i.e., the first transmission resource group contains PRB #n and the second transmission resource group contains PRB #n+1. For PRB #n, a 12-port CSI-RS resource A1 is configured to UE, based on the Rel-13 configuration mechanism, and specifically, three 4-port CSI-RS configurations are configured, e.g. A1=Config.0+Config.2+Config.5. For PRB #n+1, the same CSI-RS resource is configured to the UE, i.e. A1=A2. In this case, the number of real CSI-RS antenna ports for 20 CSI-RS ports is 20, while the allocated CSR-RS resource are three 4-port CSI-RS configurations in each transmission resource group, i.e. 24 REs in the two adjacent PRB pairs. This means that the allocated CSI-RS resource REs are more than the real CSI-RS antenna ports. Thus, four REs in A2 can be muted to solve the power boosting issues; and in this case, A1(12)=A2(12), N1(12)=A1(12), N2(8)<A2(12). The eNB can inform the UE the resources for CSI-RS in similar way to that in FIG. 6. Regarding the muted resource, the cNB can inform the UE which configuration resources of Config. 0, 2, 5 are to be muted by an RRC signal or alternatively, one of the configurations can be default to be mute in A2, e.g. Config.5 as illustrated in FIG. 7, so no RRC signal is required anymore.

For 24 CSI-RS ports, the same two 12-port CSI-RS configurations can be configured to PRB #n and PRB #n+1, that is to say, in such a case, A1(12)=A2(12), N1(12)=A1 (12), N2(12)=A2(12) and no muting is required.

In another embodiment, a still further CSI-RS port resource allocation scheme for 24 CSI-RS ports in accordance with embodiments of the present disclosure. In this scheme, the eNB can configure two 8-port CSI-RS resource for the two PRB pair transmission groups, i.e., A1=A2; and in each group, a 12-port CSI-RS resource for A1 and A2 is chosen from the configured 16-port CSI-RS resource for each PRB. And thus only 12 REs are configured to the UE in each PRB group. Since one 8-port CSI-RS resource is composed by two 4-port CSI-RS resources, so one 4-port CSI-RS resources is not used, or two 2-port CSI-RS resources not used in each group. This one 4-port/or two 2-port CSI-RS resource can be configured by RRC signaling, or alternatively, the 4-port/or two 2-port CSI-RS resource can be default information between the eNB and the UE. In addition, the unused 4-port/or two 2-port CSI-RS resources can be different in the two PRB pair transmission groups. In other words, two chose 12-port CSI-RS configuration resources in different PRB pair transmission groups can be different.

Figure 8:
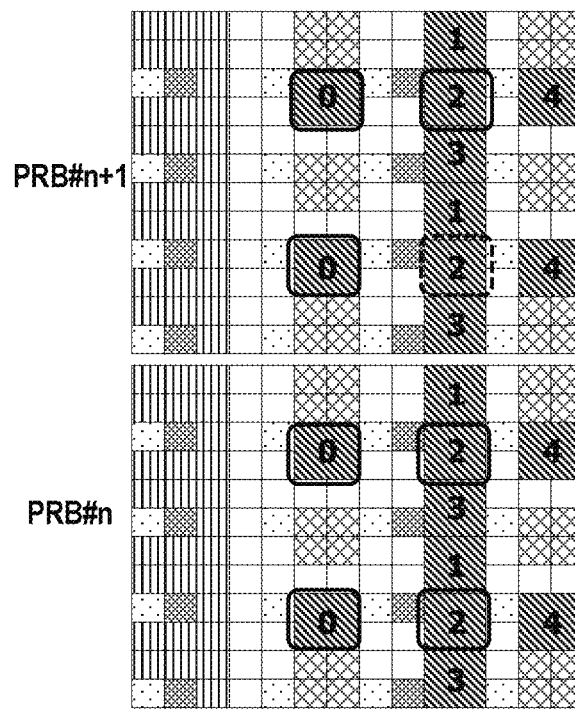
FIG. 8 illustrates another CSI-RS port resource allocation scheme for 28 CSI-RS ports in FDM mode in accordance with embodiments of the present disclosure.

FIG. 8 illustrates another CSI-RS port resource allocation scheme for 28 CSI-RS ports in FDM mode in accordance with embodiments of the present disclosure. As illustrated in FIG. 8, the transmission resource groups are divided in a similar way, i.e., the first transmission resource group contains PRB #n and the second transmission resource group contains PRB #n+1. For PRB #n, a 16-port CSI-RS resource A1 is configured to UE, based on the Rel-13 configuration mechanism, and two 8-port CSI-RS configurations are configured, e.g. A1=Config.0+Config.2. For PRB #n+1, a 12-port CSI-RS resource A2 is configured to UE, which is a sub set of A1. In this case, the real number of CSI-RS antenna ports equals to the allocated CSI-RS resource REs, that is to say, N1=A1>N2=A2, which means the N2 is a subset of N1. In such a case, the eNB may send an indication to indicate the allocated 16-port CSI-RS resource A1, and for the unused REs in A2, the eNB can send another indication to inform the UE which one of four groups is not chosen or three of four groups are chosen by RRC signal, e.g. 2 bits. Alternatively, A2 can be a default subset of A1, which means no RRC signaling is required, e.g. the 8-port CSI-RS Config.2 on right side in PRB #n+1 can be not chosen, as described in the FIG. 8 by a dashed line block. That is to say, the eNB can inform the UE the resources for CSI-RS in similar way to that in FIG. 6 but the unused REs are not muted ones but ones not chosen for the UE, i.e., those not allocated to the UE. Moreover, for REs not to be chosen, they can also be informed to the UE by an indication like an RRC signaling, or the REs not to be chosen can be default information between the eNB and UE and in such a case no RCC signaling is required. Or alternatively, in addition to the indication for the first group of configuration resources N1, the eNB can further send an indication for the second group of configuration resources N2 to the UE directly in step 504. In such a case, resources not to be chosen can be determined based on the first group of configuration resources N1 and the second group of configuration resources N2, and thus no RRC signaling or default information are required.

Thus, in embodiments of the present disclosure, for CSI-RS antenna ports {20, 24, 28, 32}, all antenna ports are located within two adjacent RB pairs, wherein a N1-port CSI-RS resource A1 is configured in the first PRB pair, a N2-port CSI-RS resource A2 is a subset of A1 and thus can be determined based on A1, N2=N1 or N2<N1. Specifically, for 28 and 32 ports, two 8-port CSI-RS configurations are configured to UE. With the legacy configuration mechanism, two 8-port CSI-RS configurations are configured by RRC signals. Therefore, in each RB pair, a 16-port CSI-RS resource is configured. In other words, eNB only need to configure one 16-port CSI-RS resource one time for every PRB pair by legacy configurations mechanism, i.e. two 8-port CSI-RS configurations. By combining two adjacent RBs, 32 REs are allocated to the UE both for 28 CSI-RS ports and 32 CSI-RS ports. Specially for 28 ports, 4 REs in one of PRB groups are muted or unused by default information or by RRC signaling. On the other hand, for 20 and 24 ports, three 4-port CSI-RS configurations are configured to UE. By utilizing the legacy configuration mechanism, three 4-port CSI-RS configurations are configured by RRC signals. Therefore, in every RB, a 12-port CSI-RS resource is configured and 24 REs are allocated to the UE both for 20 CSI-RS ports and 24 CSI-RS ports by combining two adjacent RBs. In other words, eNB only need to configure one 12-port CSI-RS resource one time for every PRB pair by legacy configurations mechanism, i.e. three 4-port CSI-RS configurations. Thus, by using the combination of legacy port configurations, such as 8-port configurations, 4-port configurations or 2-port configurations, more ports can be supported CSI-RS resource. Specially for 20 ports, 4 REs in one of PRB groups are muted or unused by default information or by RRC signaling.

Figure 9:
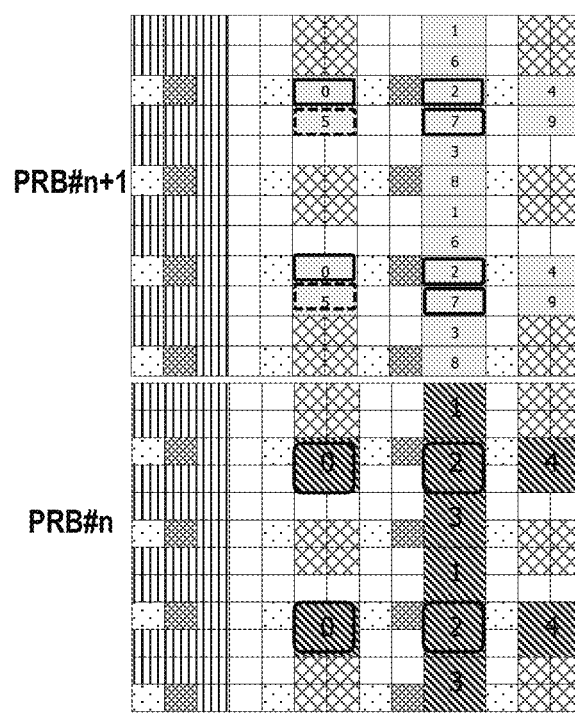
FIG. 9 illustrates a further CSI-RS port resource allocation scheme for 28 CSI-RS ports in FDM mode in accordance with embodiments of the present disclosure.

FIG. 9 illustrates a further CSI-RS port resource allocation scheme for 28 CSI-RS ports in FDM mode in accordance with embodiments of the present disclosure. The difference between the schemes as illustrated in FIG. 8 and FIG. 9 lies in that the REs not used in PRB #n+1 are not four adjacent REs but one of 4-port CSI-RS configurations. In such a case, the eNB can inform the UE which one of 4-port CSI-RS configurations is not chosen by RRC signaling, e.g. 2 bits. In the figure, Config.5 is not chosen as illustrated in dashed lines and therefore, and A2 only occupies 12-port CSI-RS resource. Likely, for 20 CSI-RS ports, a similar scheme can be adopted to that illustrated in FIG. 7, but those unused REs are not muted but those not chosen to allocated to the UE.

Figure 10:
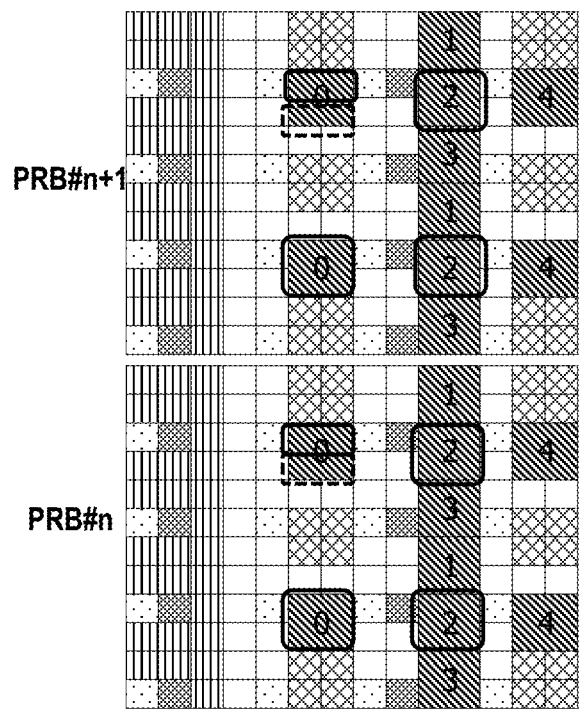
FIG. 10 illustrates a still further CSI-RS port resource allocation scheme for 28 CSI-RS ports in FDM mode in accordance with embodiments of the present disclosure.

FIG. 10 illustrates a still further CSI-RS port resource allocation scheme for 28 CSI-RS ports in accordance with embodiments of the present disclosure. In this scheme, the eNB can configure two 8-port CSI-RS resource for the two PRB transmission groups, i.e., A1=A2; and in each group, a 14-port CSI-RS resource for A1 and A2 is chosen from the configured 16-port CSI-RS resource for each PRB. And thus only 14 REs are configured to the UE in each PRB group. Since one 8-port CSI-RS resource is composed by four 2-port CSI-RS resources, so one 2-port CSI-RS resources is not used in each PRB pair group. This one 2-port CSI-RS resource can be configured by RRC signaling, e.g. 3 bits or alternatively, the 2-port CSI-RS resource can be default information between the eNB and the UE. In addition, the unused 2-port CSI-RS resources can be different in the two PRB pair transmission groups.

Figure 11:
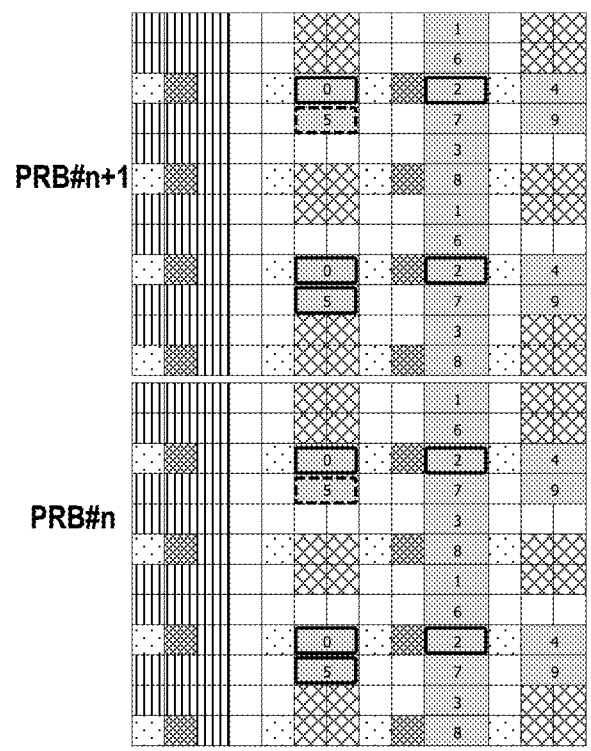
FIG. 11 illustrates another CSI-RS port resource allocation scheme for 20 CSI-RS ports in accordance with embodiments of the present disclosure.

FIG. 11 illustrates another CSI-RS port resource allocation scheme for 20 CSI-RS ports in accordance with embodiments of the present disclosure. In this scheme, the eNB can configure three 4-port CSI-RS resource for the two PRB transmission groups, i.e., A1=A2, and in each group, a 10-port CSI-RS resource for A1 and A2 is chosen from the configured 12-port CSI-RS resource for each PRB. And thus only 10 REs are configured to the UE in each PRB group and one 2-port CSI-RS resource is not used in each PRB pair group, for example Config. 5 on the top within each PRB in FIG. 11. This one 2-port CSI-RS resource can be configured by RRC signaling, or alternatively, the 2-port CSI-RS resource can be default information between the eNB and the UE. In addition, the unused 2-port CSI-RS resources can be different in the two PRB pair transmission groups.

Figure 12:
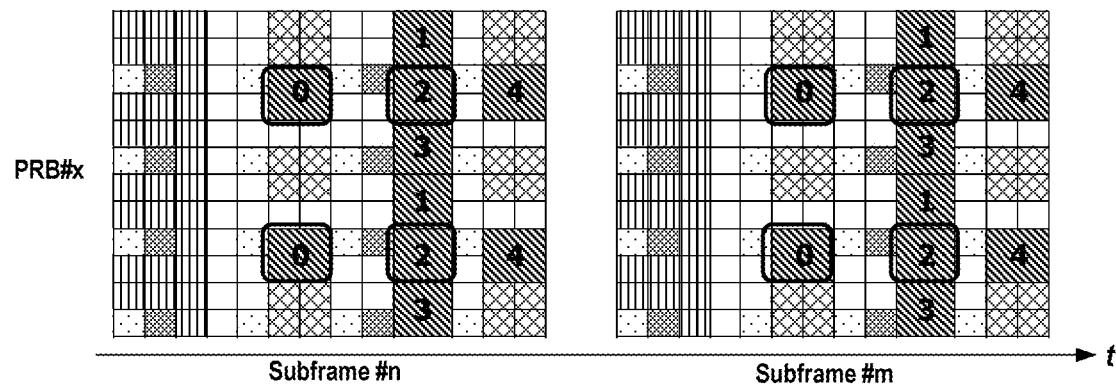
FIG. 12 illustrates an example transmission resource group division and CSI-RS port resource allocation schemes in TDM mode in accordance with embodiments of the present disclosure.

FIG. 12 illustrates an example transmission resource group division and CSI-RS port resource allocation schemes in TDM mode in accordance with embodiments of the present disclosure. All port CSI-RS resource REs are allocated within two PRB groups (PRB #x) in different subframes (subframes n and in). For example, a 16(N1)-port CSI-RS resource is configured the first group of subframes n, a 12(N2)-port CSI-RS resource is configured in the second group of subframes m, which is chosen from the 16(N1)-port CSI-RS resource with four REs or a port configuration muted or unallocated. Thus, like the schemes in FIG. 6 to 9, N2 is also a subset of N1, that is N2<N1 or N2=N1 In fact, the difference between resource allocation schemes in TDM and FDM lies in the division of the transmission resource, and other specific resource allocations can reuse those in FDM. For example, same port resources can be configured for the first and second groups of subframes and those not to be used can be muted; or alternatively, those not to be used can are allocated to UE at all for data or other RS transmission. In addition, information about the resource configurations can be sent to the UE by means of similar solution as described with reference to the FDM mode.

Figure 13:
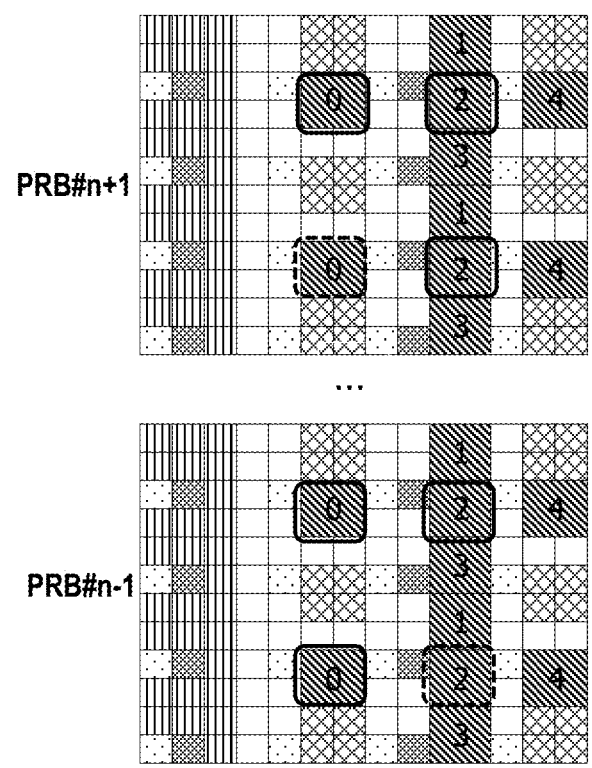
FIG. 13 illustrates another CSI-RS port resource allocation scheme for a 28-port CSI-RS configuration in FDM mode in accordance with embodiments of the present disclosure.

In addition, in order to keep power balance, it is possible to allocate different configuration resources within each transmission resource group, that is to say, A1/A2 is not all the same and it can change to solve the power balance issue. For example, different A2 are used in every two PRBs in the A2 related PRB group. FIG. 13 illustrates a CSI-RS port resource allocation scheme for a 28-port CSI-RS configuration in FDM mode in accordance with embodiments of the present disclosure. As illustrated in FIG. 13, in the second transmission resource group, PRB #n−1 and PRB n+1 are two closet transmission resources in which four REs are muted or unallocated. In such a case, in PRB #n−1, one 4-REs group in the OFDM symbols containing 8-port CSI-RS Config. 0 is not used, while in PRB n+1, one 4-REs group in the OFDM symbols containing 8-port CSI-RS Config.2 is not used. Thus, resource A2 in PRB #n−1 and resource A2 in PRB #n+1 are different but it is possible to keep the number of CSI-RS REs same in different symbols. In another embodiment of the present disclosure, the resources to be muted or allocated are not four adjacent REs but a 4-port resource configuration, like Config. 5.

Figure 14:
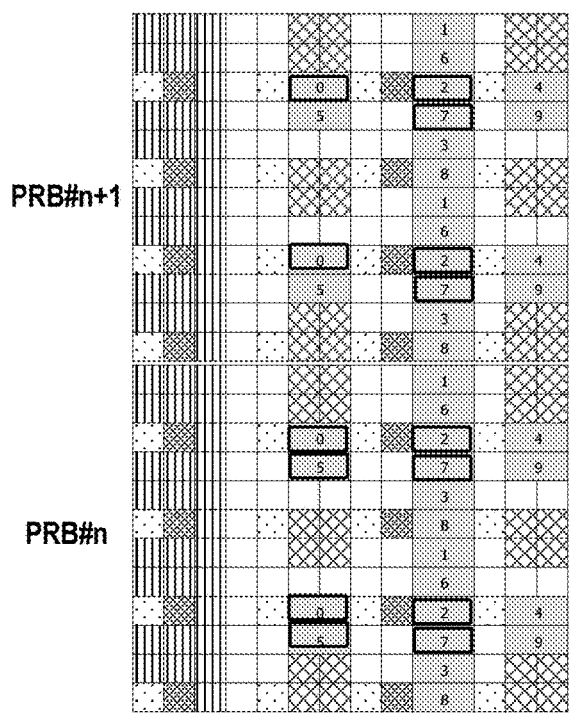
FIG. 14 illustrates a further CSI-RS port resource allocation scheme for a 28-port CSI-RS configuration in FDM mode in accordance with embodiments of the present disclosure.
Figure 15:
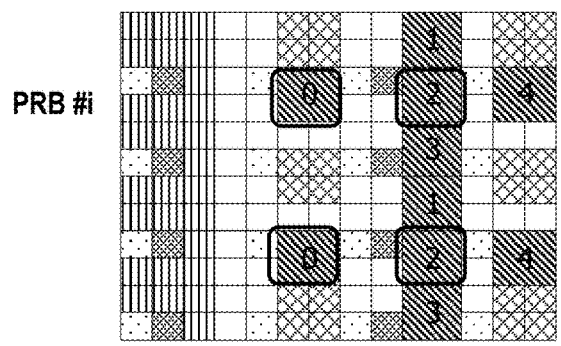
FIG. 15 illustrates a new ZP CSI-RS configuration in accordance with embodiments of the present disclosure.

Reference is made back to FIG. 5, in step 506, the eNB can send an indication for Zero power (ZP) CSI-RS configuration to the UE to indicate resource elements or a port configuration to be muted in the first group of configuration resources or the second group of configuration resources. Thus, ZP CSI-RS can be configured for one single transmission resource group to, for example, avoid signal interference. That is to say, for different transmission resource groups, it is possible to configure different ZP CSI-RSs by means of ZP CSI-RS configurations. As illustrated in FIG. 14, for 28 ports, for some UEs which need to be configured ZP CSI-RS in these REs, the eNB can configure different ZP CSI-RSs in different transmission groups. For example, the eNB can use the existing mechanism to configure ZP CSI-RS for every PRBs in one subframe, e.g. the eNB can use the existing bit map to configure ZP CSI-RS in 4-port CSI-RS configs. 0, 2, 5, 7. And then the eNB uses a new ZP CST-RS configuration indication to configure ZP-CSI-RS so that Config. 5 is only for the PRB group which contains PRB #n and it is not used in the PRB group which contains PRB #n+1.

For the solution as described with reference to FIG. 13, it is also possible to use a new ZP CSI-RS configuration. The new ZP CSI-RS can be used to configure a subset of a transmission resource group and thus different ZP CSI-RS are configured for PRB #n−1 and PRB #n+1. In other words, the PRB group contains PRB #n−1 and #n+1 can be further divided to 2 sub-group, the ZP CSI-RS can be configured for the two sub-groups separately.

Furthermore, a further new ZP CSI-RS configuration can also be introduced. In this case, one CDM-4 group in legacy 16-port CSI-RS can form one unit; in other word, each 8-port CSI-RS resource can be divided into 2 units. As described in FIG. 15, all CSI-RS resources (five 8-port CSI-RS configurations for FDD) are divided to 10 units (unit 0 to 9) for normal subframes and normal CPs, and the eNB can use a RRC signal to configure some of units 0 to 9 are ZP CSI-RS. Therefore, in such a case, the ZP CSI-RS configuration is directed to one or more units instead of a specific CSI-RS configuration.

In embodiments of the present disclosure, at the eNB, an antenna array for transmitting the reference signals can be divided to at least a first sub-array and a second sub-array so as to be mapped to the first transmission resource group and the second transmission resource group respectively. Hereinafter, reference will be made to FIGS. 16 to 38 to describe the division of the antenna array.

Figure 16:
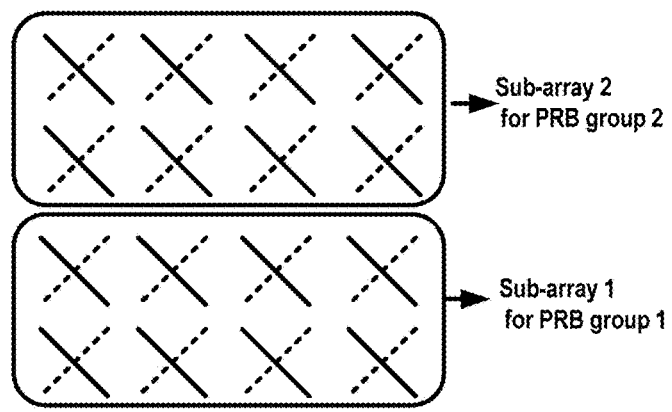
FIGS. 16 and 17 illustrate different sub-array divisions for 32 CSI-RS ports in accordance with embodiments of the present disclosure.
Figure 17:
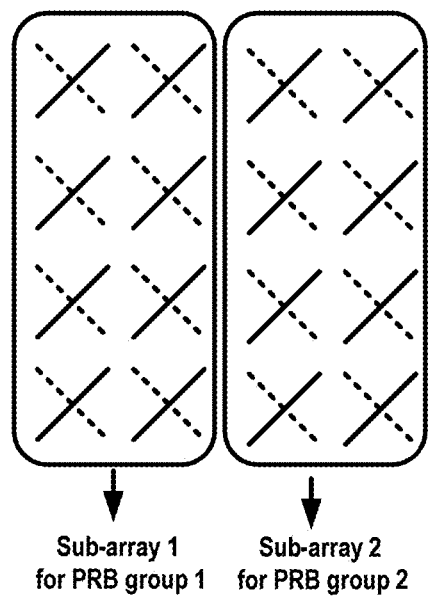
Figure 18:
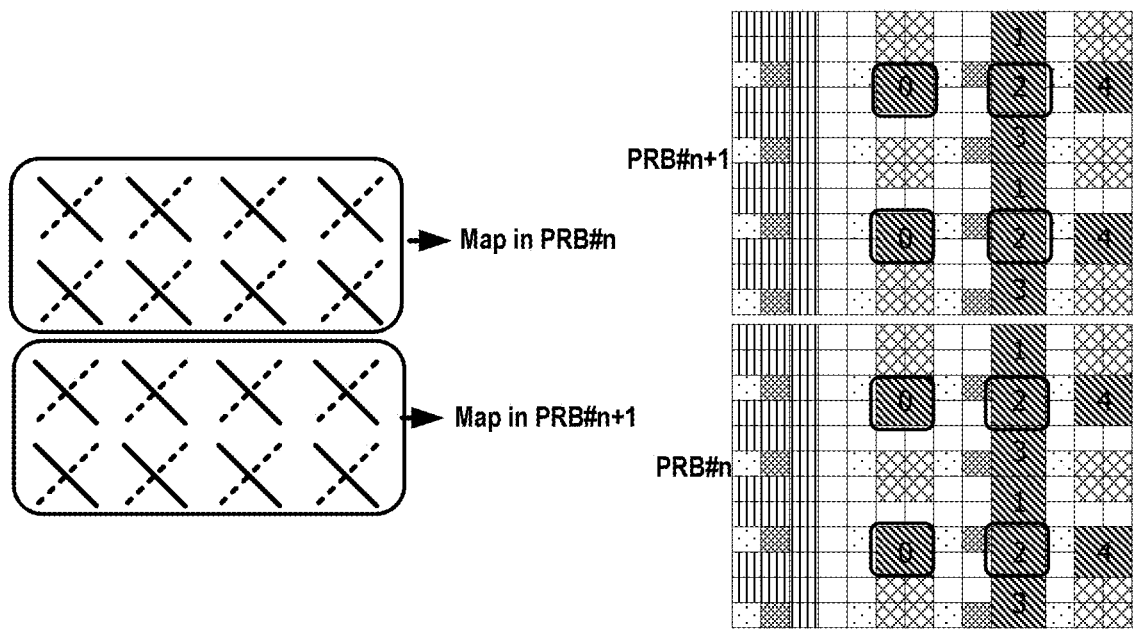
FIGS. 18 and 19 illustrate different sub-array mapping for 32 CSI-RS ports in accordance with embodiments of the present disclosure.
Figure 19:
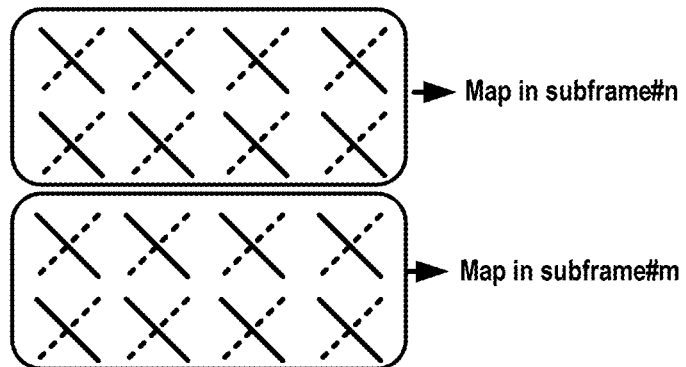

In some embodiments of the present disclosure the antenna array is divided based on rows and/or columns of the antenna array. For 32 CSI-RS ports, if a 4×4×2 (row× column×polarizations) antenna array is used, the antenna array can be divided based on rows or columns. For example, two consecutive rows can form a sub-array as illustrated in FIG. 16, or two consecutive columns can form a sub-array as illustrated in FIG. 17. Thus, the antenna array can be divided into sub-array 1 (a first sub-array) for PRB group 1 (a first transmission resource group) and a sub-array 2 (a second sub-array) for PRB group 2 (a second transmission resource group). Then, in FDM mode, the sub-arrays can be mapped to two adjacent PRBs, i.e., PRB #n and PRB #n+1, those combined together to transmit CSI-RS as illustrated in FIG. 18; while in TDM, the sub-arrays can be mapped to two different subframes, i.e., subframe #n and subframe #m, as illustrated in FIG. 19. It should be appreciated that FIGS. 18 and 19 are illustrated with 32-port CSI-RS configuration as an example, and for other port configurations, it can use similar schemes.

Figure 20:
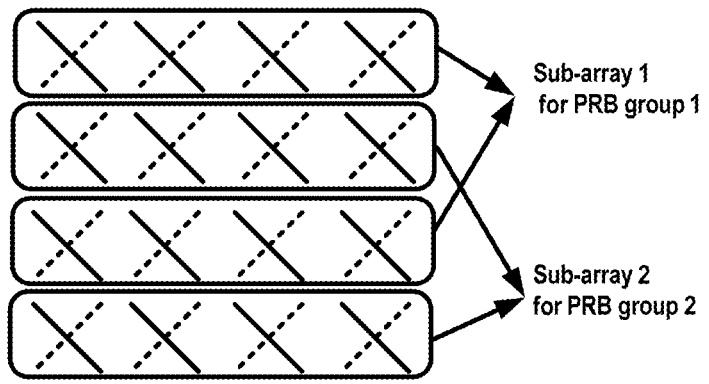
FIGS. 20 to 21 illustrate another different sub-array divisions for 32 CSI-RS ports in accordance with embodiments of the present disclosure.
Figure 21:
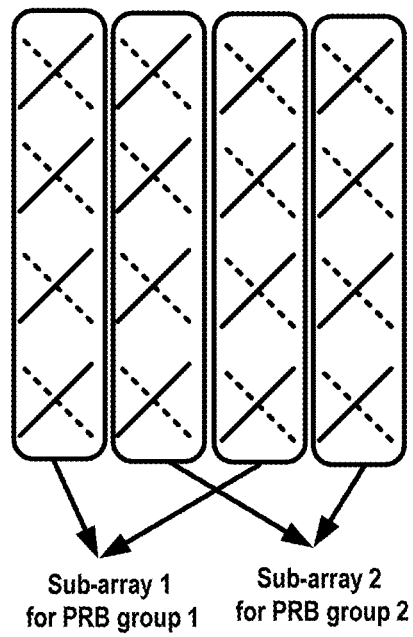

FIGS. 20 to 21 illustrate other different sub-array divisions for 32 CSI-RS ports in accordance with embodiments of the present disclosure, wherein a 4×4×2 antenna array is used. In FIG. 20, two staggered rows form a sub-array and specifically, the first and third rows in the array form the sub-array 1 for the PRB group 1 while the second and fourth rows in the array form the sub-array 2 for the PRB group 2. In FIG. 21, staggered two columns form a sub-array, and specifically, the first and third columns in the array form the sub-array 1 for the PRB group 1 while the second and fourth column s in the array form the sub-array 2 for the PRB group 2.

Figure 22:
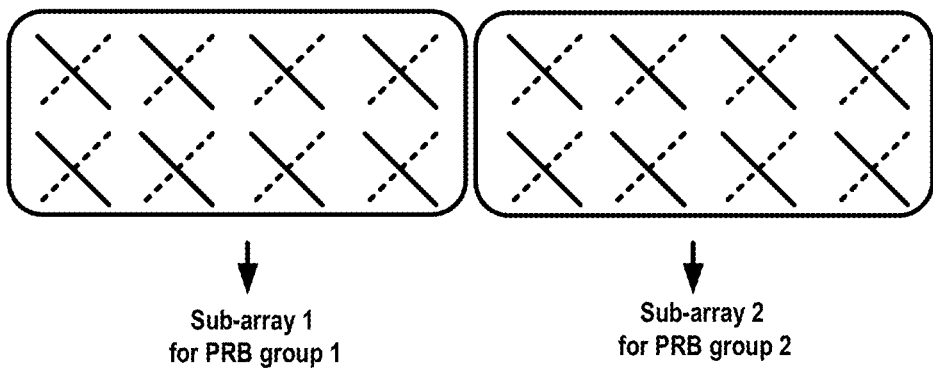
FIGS. 22 to 23 illustrate further different sub-array divisions for 32 CSI-RS ports in accordance with embodiments of the present disclosure.
Figure 23:
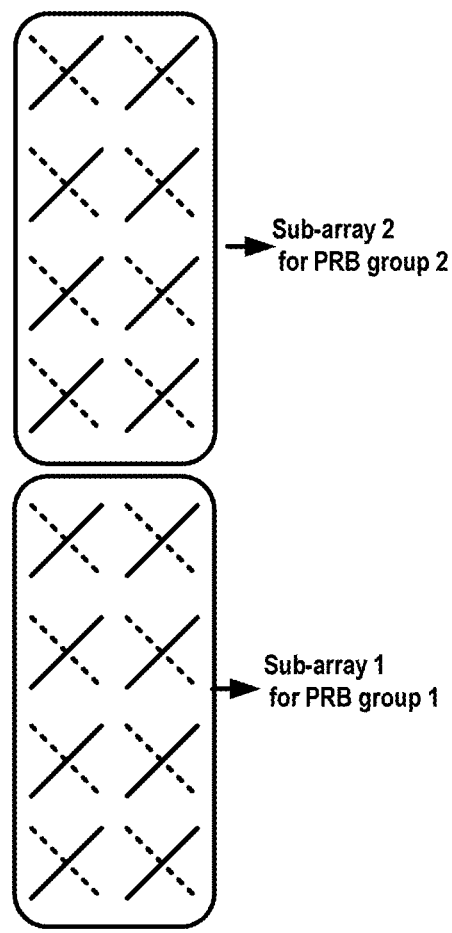

FIGS. 22 to 23 illustrate further different sub-array divisions for 32 CSI-RS ports in accordance with embodiments of the present disclosure, wherein a 2×8×2 antenna array or a 8×2×2 antenna array is used. In FIG. 22, four consecutive columns form a sub-array and specifically, the first to fourth columns in the antenna array form the sub-array 1 for the PRB group 1 while the fifth and eighth columns in the array form the sub-array 2 for the PRB group 2. In FIG. 23, four consecutive rows form a sub-array and specifically, the first to fourth rows in the array form the sub-array 1 for the PRB group 1 while the fifth and eighth rows in the array form the sub-array 2 for the PRB group 2.

Figure 24:
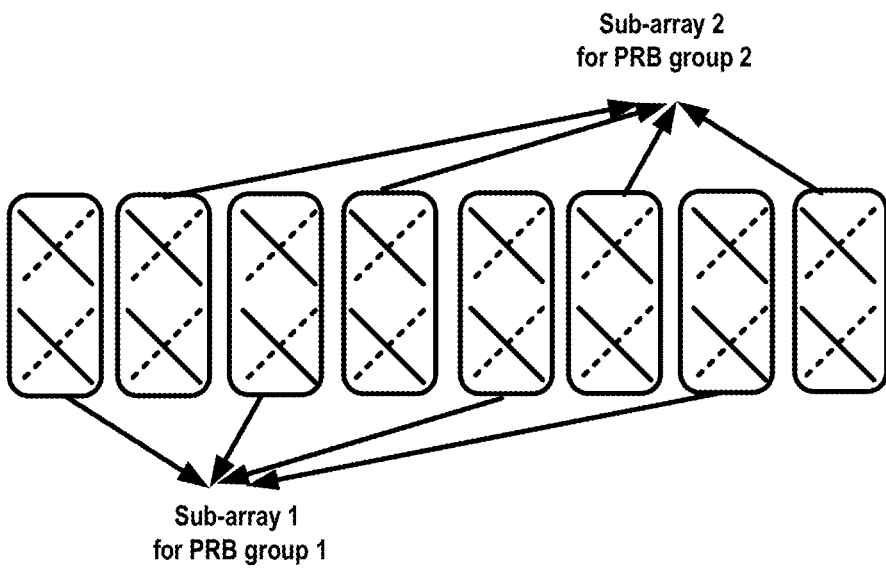
FIGS. 24 to 25 illustrate still further different sub-array divisions for 32 CSI-RS ports in accordance with embodiments of the present disclosure.
Figure 25:
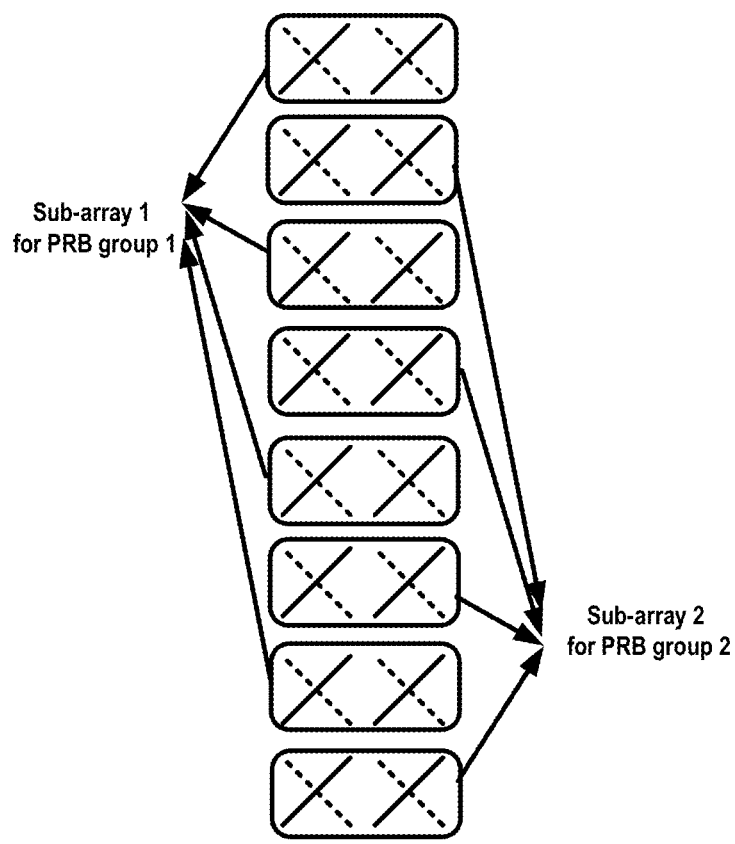

FIGS. 24 to 25 illustrate still further different sub-array divisions for 32 CSI-RS ports in accordance with embodiments of the present disclosure, wherein a 2×8×2 antenna array or a 8×2×2 antenna array is used. In FIG. 24, four staggered columns form a sub-array and specifically, the first, third, fifth and seventh columns in the array form the sub-array 1 for the PRB group 1 while the second, fourth, sixth and eighth columns in the array form the sub-array 2 for the PRB group 2. In FIG. 25, four staggered rows form a sub-array and specifically, the first, third, fifth and seventh rows in the array form the sub-array 1 for the PRB group 1 while the second, fourth, sixth and eighth rows in the array form the sub-array 2 for the PRB group 2.

Figure 26:
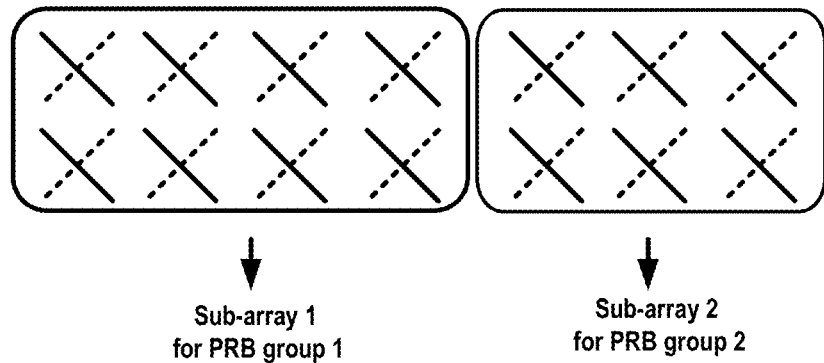
FIGS. 26 to 27 illustrate different sub-array divisions for 28 CSI-RS ports in accordance with embodiments of the present disclosure.
Figure 27:
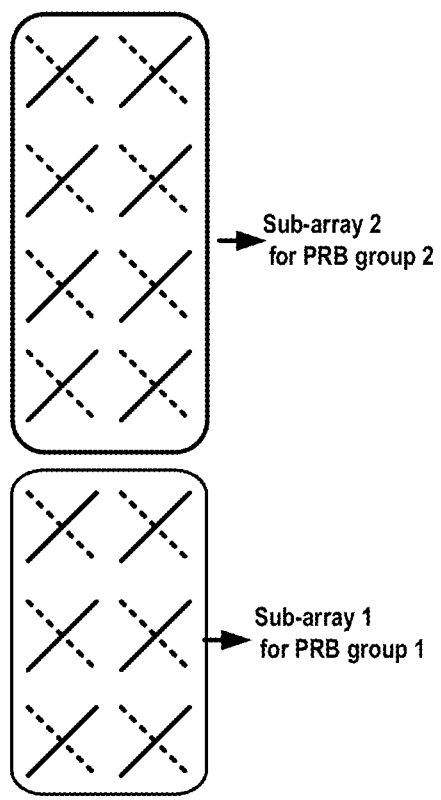

FIGS. 26 to 27 illustrate different sub-array divisions for 28 CSI-RS ports in accordance with embodiments of the present disclosure, wherein a 2×7×2 or 7×2×2 antenna array is used. In FIG. 26, consecutive columns form a sub-array but the sub-array 1 and the sub-array 2 have different numbers of ports; specifically, the first to fourth columns in the array form the sub-array 1 for the PRB group 1 while the fifth and seventh columns in the array form the sub-array 2 for the PRB group 2. In FIG. 27, consecutive rows form a sub-array, and the sub-array 1 and the sub-array 2 have different numbers of ports; specifically, the first to fourth rows in the array form the sub-array 1 for the PRB group 1 while the fifth and seventh rows in the array form the sub-array 2 for the PRB group 2.

Figure 28:
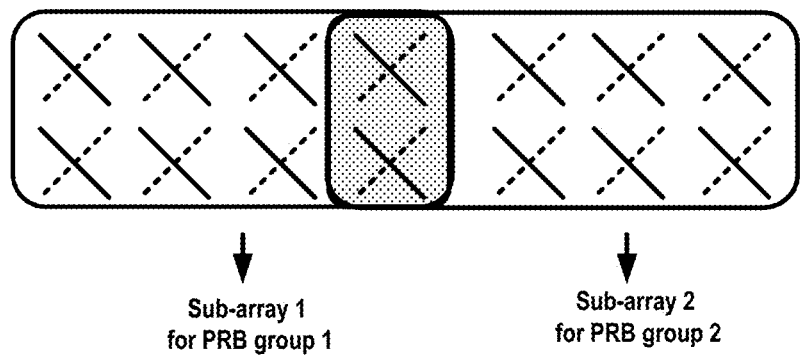
FIGS. 28 to 29 illustrate another different sub-array divisions for 28 CSI-RS ports in accordance with embodiments of the present disclosure.
Figure 29:
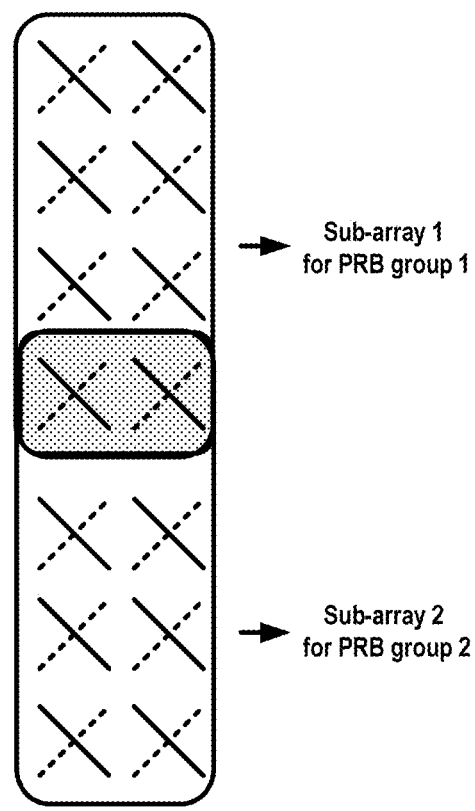

FIGS. 28 to 29 illustrate other different sub-array divisions for 28 CSI-RS ports in accordance with embodiments of the present disclosure, wherein a 2×7×2 or 7×2×2 antenna array is used. Different from those illustrated in FIGS. 26 and 27, the antenna array is divided into two overlapping groups wherein the overlapping part is illustrated by an area with dots, as illustrated in FIGS. 28 and 29. Thus, in these two schemes, the sub-array 1 and sub-array 2 have the same number of ports since the overlapping part is used in both PRB groups.

Figure 30:
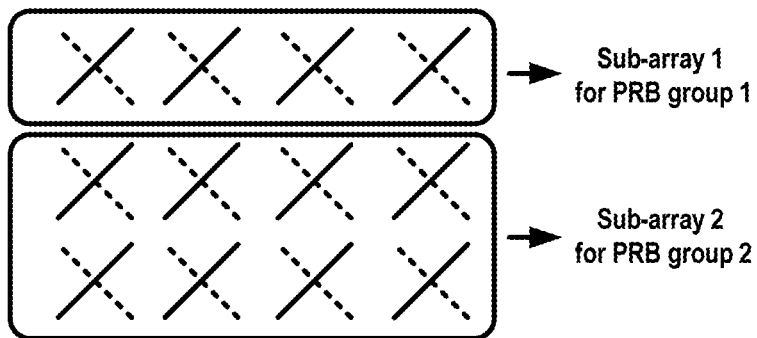
FIGS. 30 to 31 illustrate further different sub-array divisions for 24 CSI-RS ports in accordance with embodiments of the present disclosure.
Figure 31:
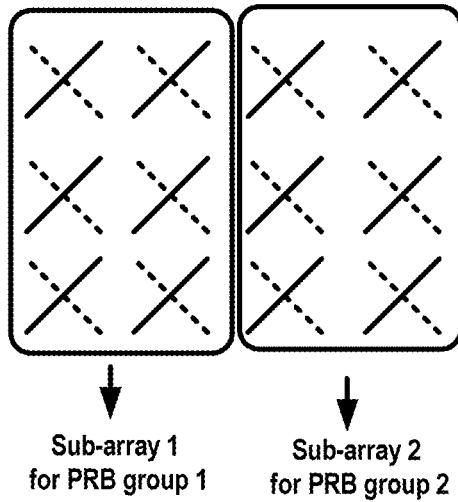

FIGS. 30 to 31 illustrate different sub-array divisions for 24 CSI-RS ports in accordance with embodiments of the present disclosure, wherein a 3×4×2 antenna array is used. In FIG. 30, one row in the antenna array forms a sub-array and two consecutive rows form another sub-array 2; specifically, the first column in the array forms the sub-array 1 for the PRB group 1 while the second and third columns in the array form the sub-array 2 for the PRB group 2. In FIG. 31, consecutive columns form a sub-array; specifically, the first and second columns in the array form the sub-array 1 for the PRB group 1 while the third and fourth columns in the array form the sub-array 2 for the PRB group 2.

Figure 32:
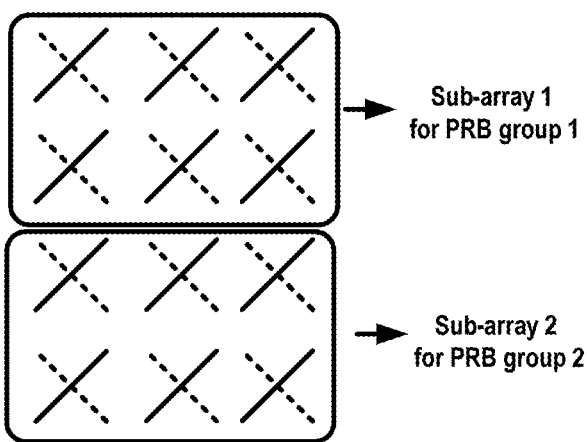
FIGS. 32 to 33 illustrate further different sub-array divisions for 24 CSI-RS ports in accordance with embodiments of the present disclosure.
Figure 33:
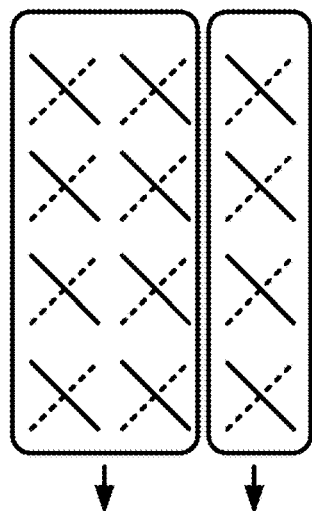

FIGS. 32 to 33 illustrate other different sub-array divisions for 24 CSI-RS ports in accordance with embodiments of the present disclosure, wherein a 4×3×2 antenna array is used. In FIG. 32, two consecutive rows form a sub-array; specifically, the first and second rows in the array form the sub-array 1 for the PRB group 1 while the third and fourth rows in the array form the sub-array 2 for the PRB group 2. In FIG. 33, one column in the antenna array forms a sub-array and two consecutive columns form another sub-array; specifically, the first and second columns in the array form the sub-array 1 for the PRB group 1 while the third column in the array forms the sub-array 2 for the PRB group 2.

Figure 34:
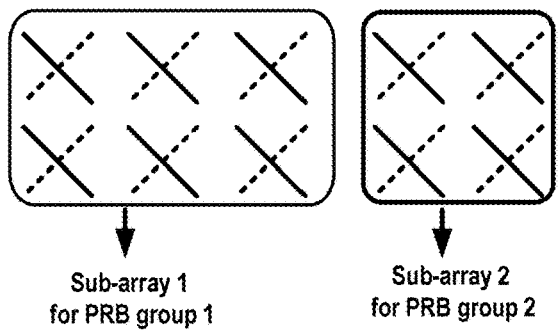
FIGS. 34 to 35 illustrate another different sub-array divisions for 20 CSI-RS ports in accordance with embodiments of the present disclosure.
Figure 35:
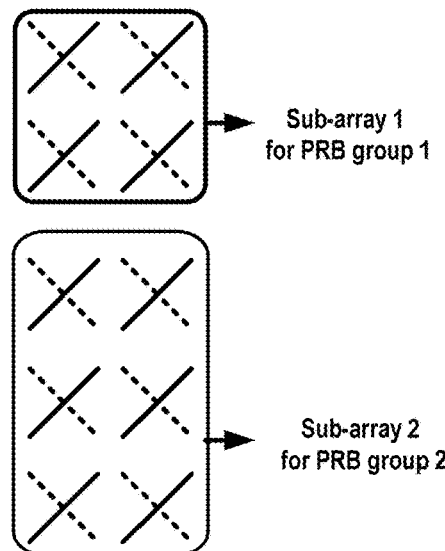

FIGS. 34 to 35 illustrate different sub-array divisions for 20 CSI-RS ports in accordance with embodiments of the present disclosure, wherein a 2×5×2 or 5×2×2 antenna array is used. In FIG. 34, consecutive columns form a sub-array but the sub-array 1 and the sub-array 2 have different numbers of ports; specifically, the first to third columns in the array form the sub-array 1 for the PRB group 1 while the fourth and fifth columns in the array form the sub-array 2 for the PRB group 2. In FIG. 35, consecutive rows form a sub-array but the sub-array 1 and the sub-array 2 have different numbers of ports; specifically, the first to second rows in the array form the sub-array 1 for the PRB group 1 while the third and fifth rows in the array form the sub-array 2 for the PRB group 2.

Figure 36:
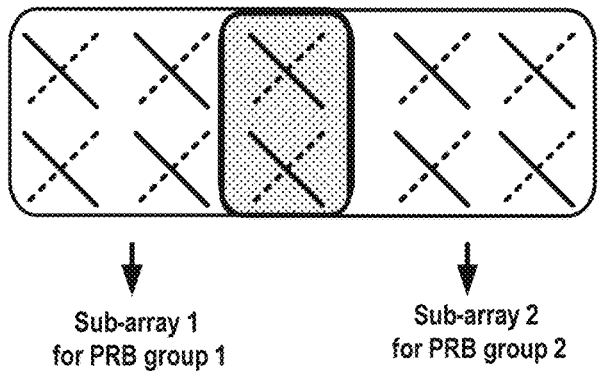
FIGS. 36 to 37 illustrate further different sub-array divisions for 20 CSI-RS ports in accordance with embodiments of the present disclosure.
Figure 37:
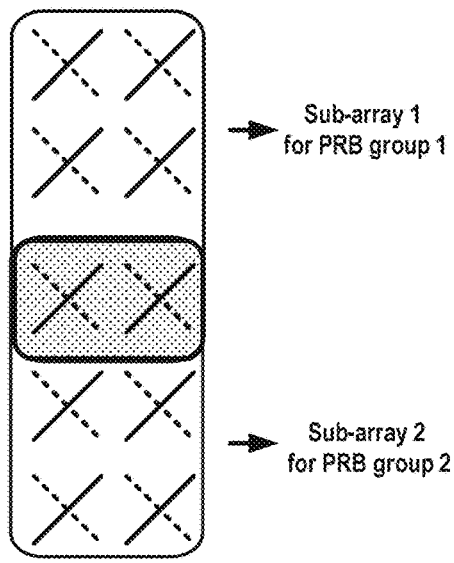

FIGS. 36 to 37 illustrate other different sub-array divisions for 20 CSI-RS ports in accordance with embodiments of the present disclosure, wherein a 2×5×2 or 5×2×2 antenna array is used. Different from those illustrated in FIGS. 34 and 35, the antenna array is divided into two overlapping groups wherein the overlapping part is illustrated by an area with dots, as illustrated in FIGS. 36 and 37. Thus, in these two schemes, the sub-array 1 and sub-array 2 have the same number of ports since the overlapping part is used in both PRB groups.

In some embodiments of the present disclosure, at least one of the first sub-array and the second sub-array can be further divided into a plurality of sub-array groups so as to be mapped to different configuration resources in respective one of the first group of configuration resources and the second group of configuration resources. In other words, different sub-array groups can be mapped onto different CSI-RS configuration resource in each transmission resource group. The sub-array can be divided based on based on rows and/or columns of the antenna array or polarization directions of antennae in the antenna array. For example, the mechanism for dividing the sub-array can be different for CDM-2 and CDM-4. For CDM-2, a sub-array can be divided based on rows and/or columns of the antenna array since it is allowed to comprise different polarizations in a single transmission resource group. While for CDM-4, a sub-array can be divided based on polarization directions of the antenna array since a single transmission resource group shall use antennae with same polarizations.

Figure 38:
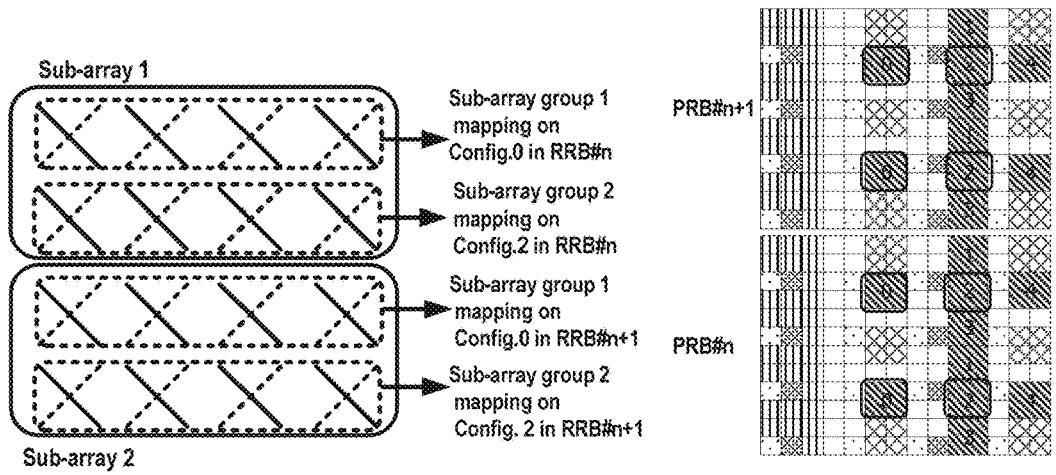
FIG. 38 illustrates an example sub-array group division for 32 CSI-RS ports with CDM-2 in accordance with embodiments of the present disclosure.

FIG. 38 illustrates an example sub-array group division for 32 CSI-RS ports with CDM-2 in accordance with embodiments of the present disclosure. As illustrated in FIG. 38, two 8-port CSI-RS configurations are allocated in each PRB and each of the sub-arrays 1 and 2 is further divided into two sub-array group 1 and 2 based on rows, and each of sub-array groups 1 and 2 is mapped to one 8-port CSI-RS configuration within PRB #n or PRB #n+1. The sub-array group 1 within the sub-array 1 is mapped to Conf. 0 in PRB #n, the sub-array group 2 within the sub-array 1 is mapped to Conf. 2 in PRB #n; the sub-array group 1 within the sub-array 2 is mapped to Conf. 0 in PRB #n+1, the sub-array group 2 within the sub-array 2 is mapped to Conf. 2 in PRB #n+1. However, it can be seen that the sub-arrays 1 and 2 can also be divided into two sub-array group 1 and 2 based on other rules, like column, or both rows and column.

Figure 39:
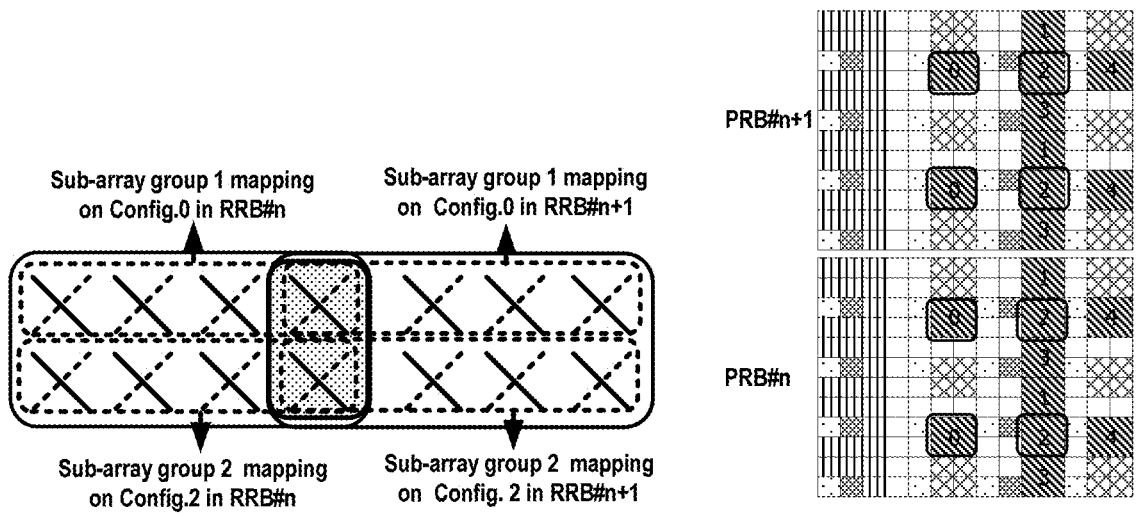
FIG. 39 illustrates an example sub-array group division for 28 CSI-RS ports with CDM-2 in accordance with embodiments of the present disclosure.

FIG. 39 illustrates an example sub-array group division for 28 CSI-RS ports with CDM-2 in accordance with embodiments of the present disclosure. In FIG. 39, the antenna array is divided into two sub arrays 1, 2 based on rows with the scheme as illustrated in FIG. 28 and each of the sub-arrays 1 and 2 is further divided into two sub-array group 1 and 2 based on rows, as illustrated in FIG. 39. Similarly, each of sub-array groups 1 and 2 is mapped to one 8-port CSI-RS configuration within PRB #n or PRB #n+1.

Figure 40:
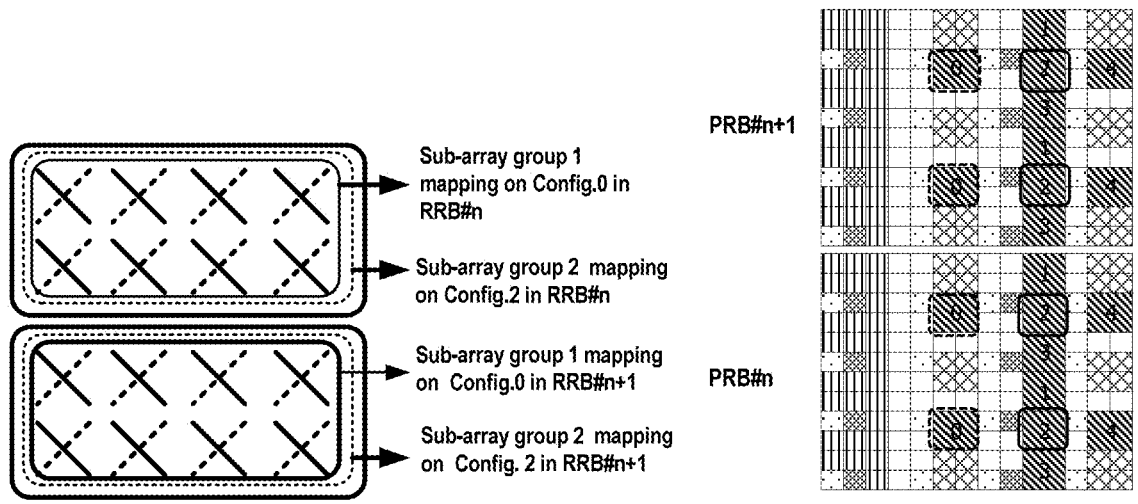
FIG. 40 illustrates an example sub-array group division for 32 CSI-RS ports with CDM-4 in accordance with embodiments of the present disclosure.

FIG. 40 illustrates an example sub-array group division for 32 CSI-RS ports with CDM-4 in accordance with embodiments of the present disclosure. As illustrated in FIG. 40, two 8-port CSI-RS configurations are allocated in each PRB and each of the sub-arrays 1 and 2 is further divided into two sub-array group 1 and 2 based on their polarizations, and each of sub-array group 1 and 2 is mapped to one 8-port CSI-RS configuration. The sub-array group 1 comprises antennae with a first polarization (indicated by solid lines) and the sub-array group 2 comprises antennae with a different second polarization (indicated by dashed lines). Sub-array group 1 and 2 in sub-array 1 maps on Config. 0 and Config. 2 within PRB #n respectively. Sub-array group 1 and 2 in sub-array 2 maps on Config. 0 and Config. 2 within PRB #n+1 respectively.

It shall be noticed that for 28 and 32 antenna ports, the eNB can configure Rel-13 UE to 16 CSI-RS ports. Therefore, the Rel-13 UE and new UE share the same CST-RS resource. Actually, the 16-port CST-RS in PRB #n and PRB #n+1 measured by Rel-13 UEs are from different antenna ports, but it is transparent for Rel-13 UEs. In this sense, it may impact channel estimation to legacy UE. However, the solution as described herein can reduce CSI-RS overhead significantly since the new UE and the legacy UE can use the CDM in the same way and the legacy UE needs no additional CSI-RS resources. In addition, it shall be noticed that all solutions described herein can also be used in the Downlink Pilot Time Slot (DwPTs).

Figure 41:
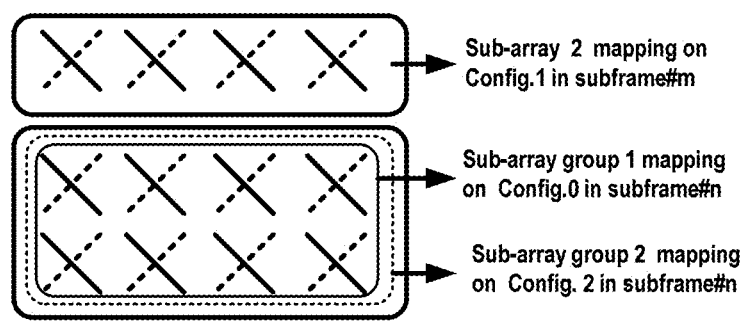
FIG. 41 illustrates an example sub-array group division for 24 CSI-RS ports with CDM-2 in TDM mode in accordance with embodiments of the present disclosure.

FIG. 41 illustrates an example sub-array group division for 24 CSI-RS ports in TDM mode in accordance with embodiments of the present disclosure. As illustrated in FIG. 41, sub-array 1 contains two 8-port CSI-RS configurations and sub-array 2 contains one 8-port CSI-RS configuration. Sub-array 2 is further divided into two sub-array group 1 and 2 based on their polarizations, and each of sub-array group 1 and 2 is mapped to one 8-port CSI-RS configuration within the sub-array 2. The sub-array group 1 comprises antennae with a first polarization (indicated by solid lines) and the sub-array group 2 comprises antennae with a different second polarization (indicated by dashed lines). Sub-array group 1 and 2 in sub-array 1 are mapped on Config. 0 and Config. 2 respectively within subframe #n and the sub-array 2 maps on the 8-port CSI-RS configuration (Config. 1) within subframe #m, as illustrated in FIG. 42.

It shall be noticed that the two subframes #m and #n are better to be two consecutive or close subframes for better channel estimation. In this case, the eNB can configure 16 CSI-RS ports to legacy Rel-13 UEs with CDM-4 in subframe #n. Alternatively, the eNB can also configure legacy UE 8 ports with CDM-2.

It shall be also noted that the antenna array division scheme is not limited to the CSI-RS port extension solution as described hereinabove and it can also be applied to any solution wherein different transmission resource groups are used.

In addition, it shall be noticed that FIGS. 38 to 42 are only some examples of sub-array group division and the present disclosure is not limited thereto. In addition, these embodiments do not show all possibilities of sub-array group division for all possible ports; however the skilled in the art can implement the division based on the ideas and principles as described herein.

In a case that more CSI-RS ports are supported, a higher order OCC sequence can be used. For example, an OCC sequence with a length of 8 can be used. FIG. 43 illustrates an example of Orthogonal Variable Spreading Factor (OVSF) for OCC in accordance with embodiments of the present disclosure. From FIG. 43, it is clear that the OVSF is a 8×8 matrix.

In a case that the high order OCC sequence is used, the CDM-8 can be supported, which can achieve better channel estimation and at the same ensure the power boosting not exceeding the threshold 6 dB. In existing solution, there is a threshold 6 dB for power boosting and if the solution recited in the present disclosure is used, there is a risk that the power boosting exceeds the threshold 6 dB since transmission resource groups are used and more REs are used. However, by means of CDM-8, 8-port CSI-RS can be mapped onto one legacy 8-port CSI-RS resource, i.e. one legacy 8-port CSI-RS resource is a CDM-8 group. In embodiments of the present disclosure, same resource configurations are multiplexed by using the high order OCC sequence and/or wherein different resource configurations are multiplexed by using the high order OCC sequence.

As illustrated in FIG. 44, for 32-port CSI-RS, CSR-RSs are mapped onto 8-port CSI-RS configuration 2, 3 in PRB #n and PRB #n+1 by CDM 8 and thus all CSI-RS ports are mapped within two PRBs.

Figure 45:
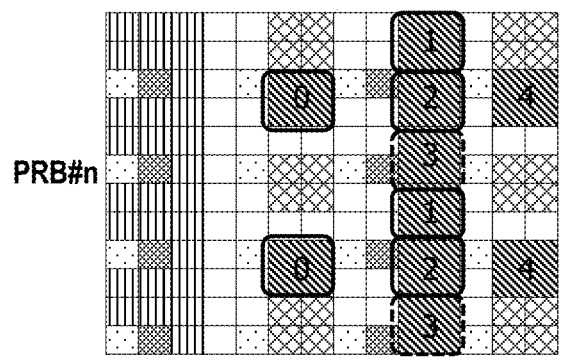
FIG. 45 illustrates another scheme for CDM 8 for 32 CSI-RS ports in FDM mode in accordance with embodiments of the present disclosure.

In a case of 32 ports within a single PRB, it is also possible to use CDM 8. As illustrated in FIG. 45, CSR-RSs are mapped onto 8-port CSI-RS configuration 0, 1, 2, 3 in PRB #n by CDM 8 and thus all CSI-RS ports are mapped within one PRB.

Figure 46:
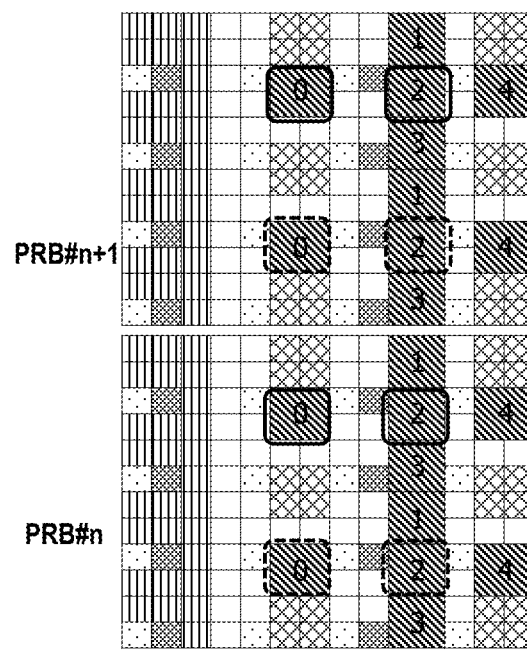
FIG. 46 illustrates further scheme for CDM 8 for 32 CSI-RS ports in FDM mode in accordance with embodiments of the present disclosure.

FIG. 46 illustrates another scheme for CDM 8 for 32 CSI-RS ports in FDM mode in accordance with embodiments of the present disclosure. As illustrated in FIG. 46, a 8-port CSI-RS can map on REs which are combined from a part of first 8-port CSI-RS configuration and a part of the second 8-port CSI-RS configuration. That is to say, resource group 0 and 2 are combined together by CDM 8.

Figure 47:
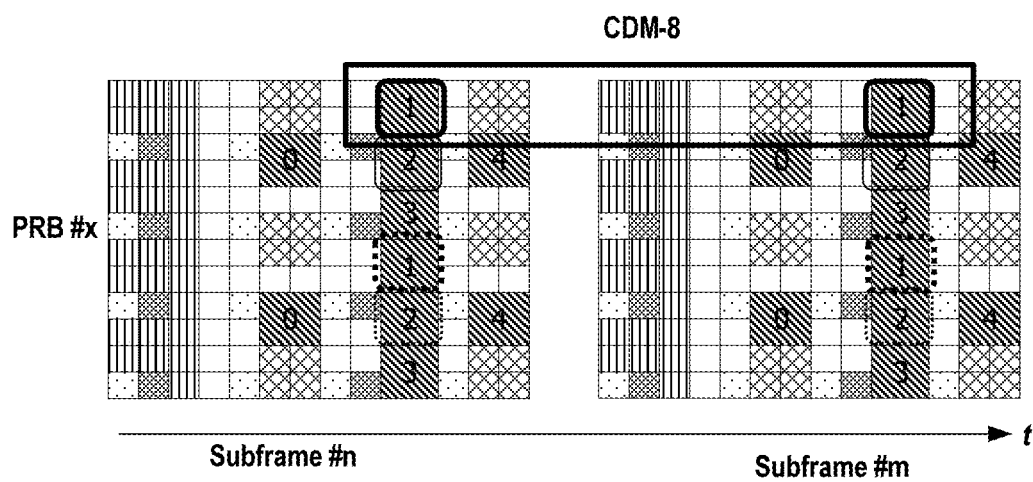
FIG. 47 illustrates another scheme for CDM 8 for 32 CSI-RS ports in TDM mode in accordance with embodiments of the present disclosure.

FIG. 47 illustrates further scheme for CDM 8 for 32 CSI-RS ports in TDM mode in accordance with embodiments of the present disclosure. As illustrated in FIG. 47, 8 ports CSI-RS within one CDM8 group can map on REs which are combined from the part of first 8-port CSI-RS resource within subframe #n and the part of the second 8-port CSI-RS resource within subframe #m. Thus, in this scheme, the first part and the second part come from different subframes, as indicated by bold line blocks, dashed line blocks, heavy dashed line blocks and light dashed line blocks in FIG. 47.

Figures 48, 49:
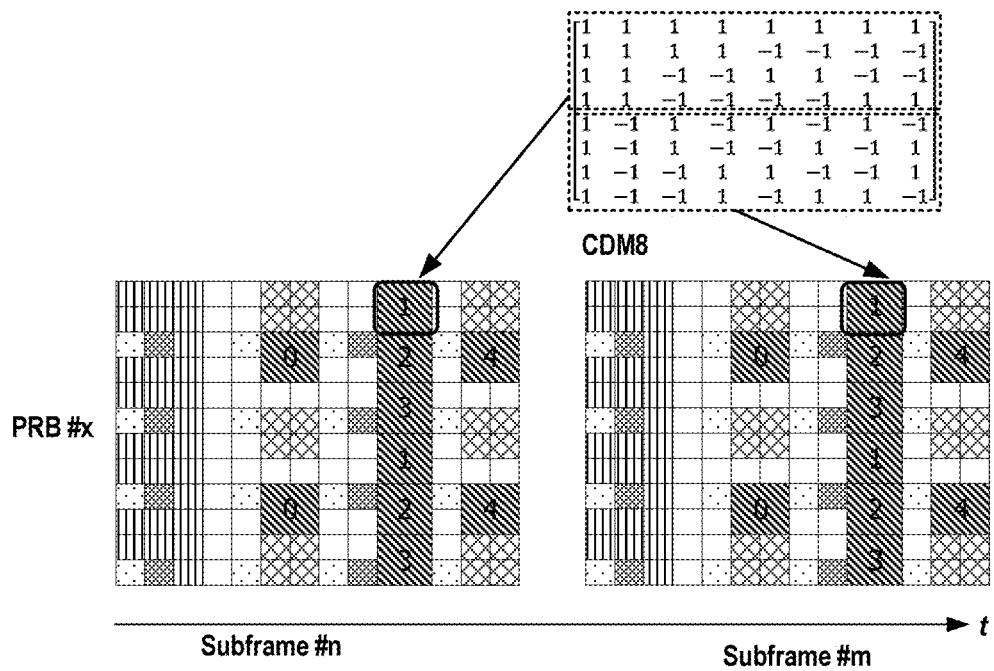
FIG. 48 illustrates a first sequence part and a second sequence part of the OCC sequence in accordance with embodiments of the present disclosure.
FIG. 49 illustrates a scheme for using the first sequence part and the second sequence part of the OCC sequence in accordance with embodiments of the present disclosure.

In addition, the OCC sequence can be configured to comply with the legacy UE. In an embodiment of the present disclosure, the OCC sequence can include two parts, a first sequence part and a second sequence part as illustrated in FIG. 48, wherein the first sequence part contains legacy OCC sequences and the second sequence part contains extended OCC sequences. For the sequence indicated by the dashed line in the second column, the first sequence part is [1, 1, 1, 1] which is an OCC sequence defined for CDM-4 in 36.211 d00 of Rel. 13 Agreements in RAN1 #84 and the second sequence part is a new one [−1 −1 −1 −1].

The first sequence part can be mapped on the first subframe #n, and the second sequence part can be mapped on the second subframe #m as illustrated in FIG. 49. Thus, the legacy UE and the new UE may share same CSI-RS resource in the first subframe. That is to say, configuration resources which can be used by legacy users are multiplexed using the first sequence part. In this case, the antenna port measured by legacy UE is virtualized by two new ports.

For 8 ports within one CDM8 group, each port is mapped onto 8 REs and corresponds to one 8-length OCC sequence. For example, as illustrated in FIG. 50, port a corresponds to the OCC sequence [1 1 1 1 1 1 1 1] and port b corresponds to the OCC sequence [1 1 1 1 −1 −1 −1 −1] and it is clear that the two OCC sequence share the same first sequence part. For the legacy UE which shares CSI-RS resources as described with reference to FIG. 49, the measured channel value for port i corresponding to 4-length OCC sequence [1 1 1 1] is actually a composite channel with port a and port b. In other word, the measured channel value hi=ha+hb.

In addition, for 8 ports within one CDM8 group, it may set the OCC sequence for some antenna ports, to multiply $e^{j\theta}$ instead of the binary value, as illustrated in FIG. 51. The θ can be set with best downtilt when deployment. One or more candidates for θ can be informed to New UEs by RRC signaling. Then hi=ha+hb*$e^{j\theta}$.

It shall be noted that the CDM 8 scheme can also be applied a solution wherein all ports are located within a single PRB and is not limited the solution with two different transmission resource groups. In fact, it is possible to apply the CDM-8 scheme to any solution wherein four RE can be combined together.

With embodiments of the present disclosure, it may support more ports for reference signals such as CSI-RS, and the legacy CSI-RS resource configuration mechanism can be reused and at the same time the RRC signal overhead, standard complexity and impact on the legacy UE can be reduce substantially.

Figure 52:
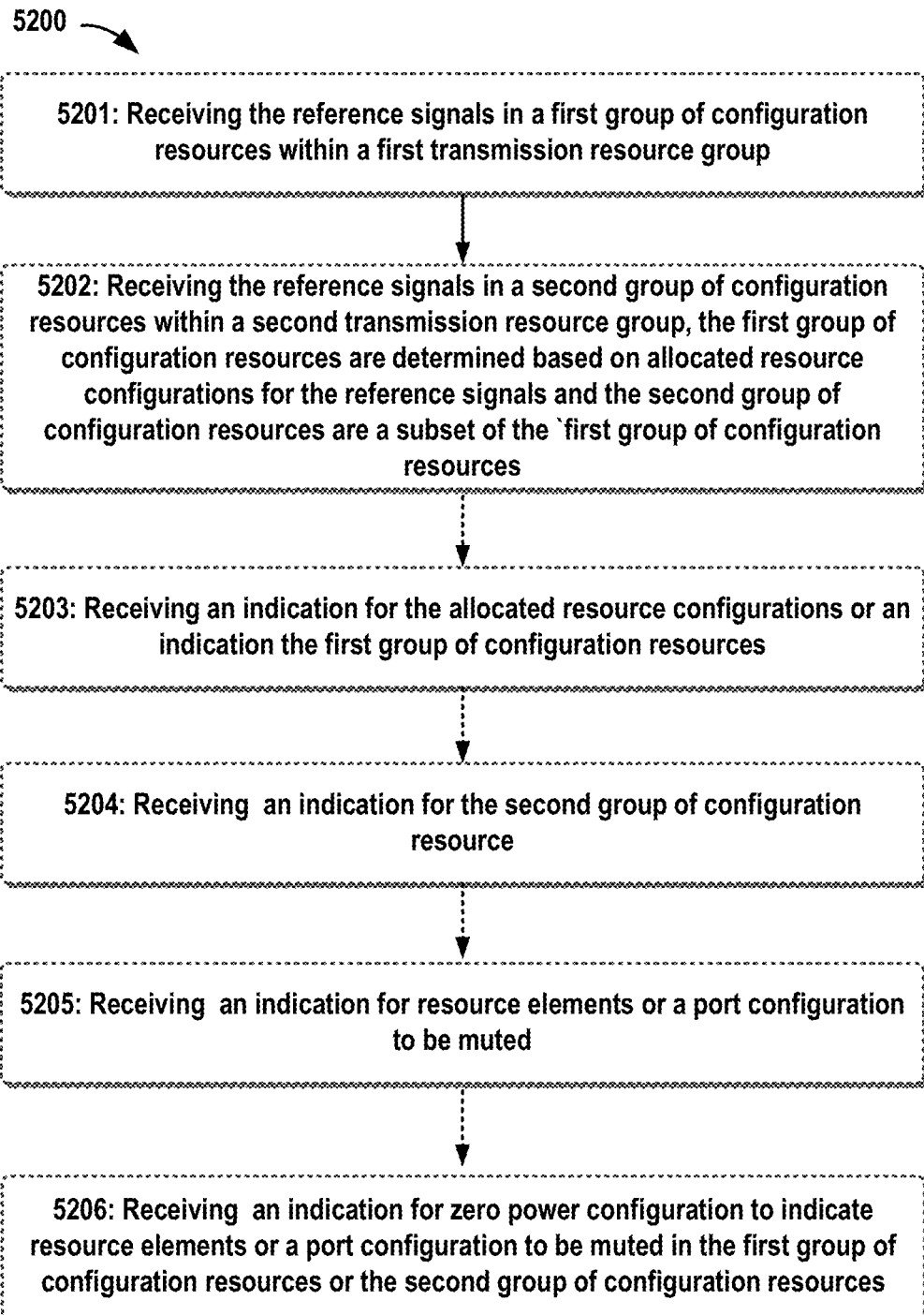
FIG. 52 schematically illustrates a flow chart of a method 5200 of receiving reference signals according to another embodiment of the present disclosure.

In addition, in the present disclosure, there is also provide a method of receiving reference signals, which will be described with reference to FIG. 52. FIG. 52 further illustrates a flow chart of a method of receiving reference signals in accordance with the present disclosure. The method 5200 can be performed at the terminal device like UE.

As illustrated in FIG. 52, first in step 5201, reference signals are received in a first group of configuration resources within a first transmission resource group and in step 5202, reference signals are received in a second group of configuration resources within a second transmission resource group. Particularly, the first group of configuration resources are determined based on allocated resource configurations for the reference signals and the second group of configuration resources are a subset of the 'first group of configuration resources.

As described hereinabove, the transmission resources can be divided into at least two transmission resource groups, and reference signals are transmitted by combining transmission resources from both the transmission resource groups; in other words, at least two PRBs or at least two subframes are used jointed to transmit reference signals like CSI-RS to support more CSI-RS ports to improve channel estimation values. At the same time, the first group of configuration resources and the second group of configuration resources can be determined as described hereinabove and thus, legacy CSI-RS resource configuration mechanism may be reused. That is to say, the allocated resource configurations comprise a combination of legacy resource configurations for reference signal. The legacy resource configurations may comprise 2-port configuration, 4-port configuration and 8-port configuration. Resources in the allocated resource configurations unused by the first group of configuration resources and/or the second group of configuration resources can be notified to the UE by RRC signals to mute them or cancel their configuration. Thus, RRC signal overhead, standard complexity and impact on legacy UE can be reduced.

For example, for 28 and 32 ports, two 8-port CSI-RS configurations can be configured to UE by RRC signals and thus in each RB, 16-port CSI-RS resource is configured. By combing two adjacent RB, totally 32 RE are allocated to the UE for both 28 CSI-RS ports and 32 CSI-RS port. For 28 CSI-RS, four REs or one 4-port configuration are unused. The unused resources can be muted; or alternatively, an RRC signal can be used to cancel the allocation of the unused resources. For 20 and 24 ports, three 4-port CSI-RS configurations can be configured to UE by RRC signals and thus in each RB, 12-port CSI-RS resource is configured. By combing two adjacent RB, totally 24 are allocated to the UE for both 20 CSI-RS ports and 24 CSI-RS port. For 20 CSI-RS, four REs or one 4-port configuration are unused. The unused resources can be muted; or alternatively, an RRC signal can be used to cancel the allocation of the unused resources.

In the FDM mode, one of the first transmission resource group and the second transmission resource group can contain odd-numbered physical resource blocks while the other of them contains even-numbered physical resource blocks. In a TDM mode, one of the first transmission resource group and the second transmission resource group contains physical resource blocks in a first group of subframes and the other of them contains physical resource blocks in a different second group of subframes. Thus, in TDM, it works well as long as the first group of subframes and the second group of subframes are different.

The resource configurations can be allocated based on predetermined rules which are known for both the eNB and UR and thus, and thus notification of detailed information on the resource configurations can be omitted. In addition, the information about the resource configurations can also be indicated by one or more indication. For example, the UE may receive an indication for the allocated resource configurations at step 5203. Then, the first group of configuration resources can be determined based on the allocated resource configurations and the second group of configuration resource can be determined based on the first group of configuration resources. Or alternatively, the UE may receive an indication for the first group of configuration resource and determines the second group of configuration resource based on the first group of configuration resources. Moreover, as another option, the UE may also receive an indication for the second group of configuration resource in step 5204.

In a case that unused resources are not allocated to the UE, the UE may receive an indication for resource configurations and receive an indication for resources in the resource configurations not to be allocated to the first group of configuration resources and/or the second group of configuration resources. Thus, no superfluous resources are allocated to the UE. On the other hand, in a case that unused resources are muted, the resources in the allocated resource configurations to be muted may contain predetermined resource elements or a predetermined port configuration. Or alternatively, the UE may receive an indication for resource elements or a port configuration to be muted in step 5205.

Besides, in order to keep the power balance or reduce interference on other UEs, an indication for zero power configuration may further be used. Thus, the UE may further receive, in step 5206, an indication for zero power configuration which indicates resource elements or a port configuration to be muted in the first group of configuration resources or the second group of configuration resources.

In embodiments of the present disclosure, the reference signals for different layers can be obtained from same configuration resources with a high order orthogonal cover code (OCC) sequence, for example those with a length of 8 as illustrated in FIG. 43. Thus, CDM8 can be used, and it is possible multiplex same resource configurations by using the high order OCC sequence and it is possible to multiplex different resource configurations using the high order OCC sequence. In an embodiment of the present disclosure, the high order OCC sequence can include a first sequence part containing legacy OCC sequence and a second sequence part containing extended OCC sequence. Thus, reference signals for different layers on configuration resources which can be used by legacy users are obtained by using the first sequence part and the impact on the legacy UE can be further reduced greatly.

It shall be noted that the method 5200 is described in brief with reference to FIG. 52. It is noted that steps and features in the methods 5200 have a corresponding functionalities to those as described with reference to FIGS. 5 to 51. Therefore, for details about the operations and functionalities, one may refer to those descriptions made with respect to the respective steps of the methods with reference to FIGS. 5 to 51.

Figure 53:
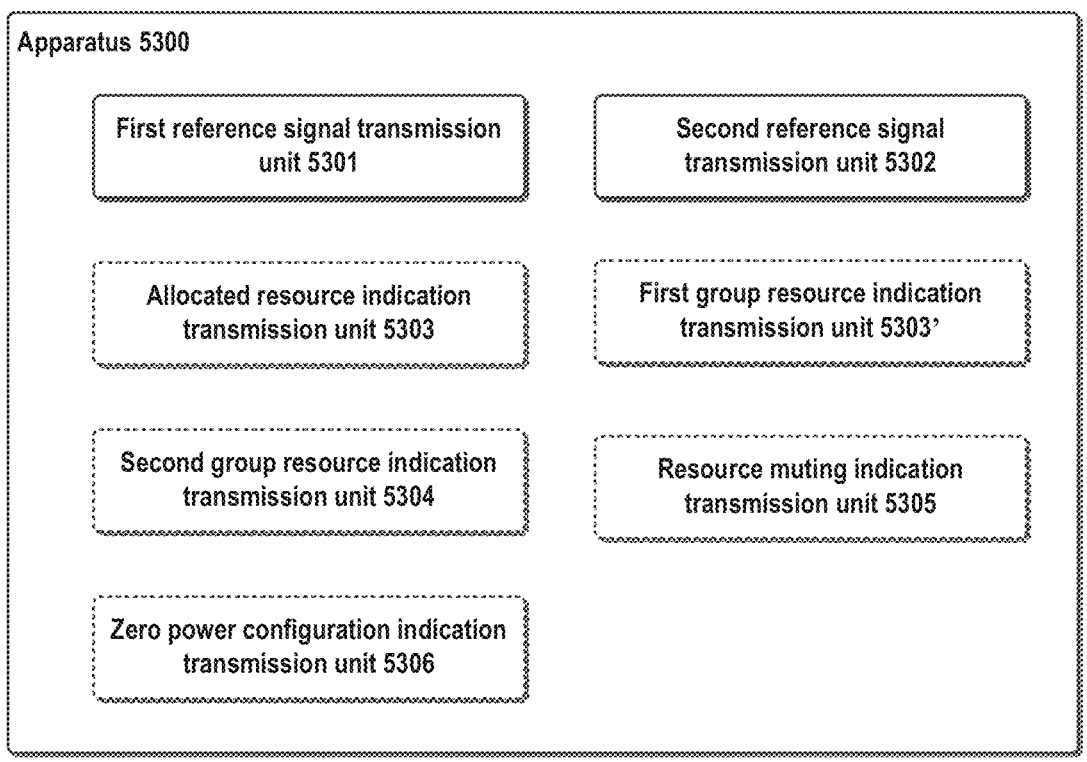
FIG. 53 schematically illustrates a block diagram of an apparatus 5300 for transmitting reference signals in accordance with one embodiment of the present disclosure.

FIG. 53 schematically illustrates an apparatus for transmitting reference signals according to an embodiment of the present disclosure. The apparatus 5300 can be comprised at a serving node, for example a BS, like a node B (NodeB or NB).

As illustrated in FIG. 53, the apparatus 5300 comprises a first reference signal transmission unit 5301 and a second reference signal transmission unit 5302. The first reference signal transmission unit 5301 is configured to transmit the reference signals using a first group of configuration resources within a first transmission resource group, while the second reference signal transmission unit 5302 is configured to transmit the reference signals using a second group of configuration resources within a second transmission resource group. The first group of configuration resources are determined based on allocated resource configurations for the reference signals and the second group of configuration resources are a subset of the first group of configuration resources.

The first group of configuration resources can be a part of the allocated resource configurations, or some resources in the allocated resource configurations. In some embodiments of the present disclosure, resources in the allocated resource configurations unused by the first group of configuration resources and/or the second group of configuration resources can be muted.

In some embodiments of the present disclosure, the allocated resource configurations can comprise a combination of legacy resource configurations for reference signal.

In some embodiments of the present disclosure, the second group of configuration resources contain different configuration resources for two closet transmission resources in the second transmission resource group.

In some embodiments of the present disclosure, the apparatus 5300 may further comprise: an allocated resource indication transmission unit 5303, which is configured to transmit an indication for the allocated resource configurations. Or alternatively, the apparatus may further comprise a first group resource indication transmission unit 5303', which is configured to transmit an indication for the first group of configuration resources.

In some embodiments of the present disclosure, the apparatus 5300 further comprises a second group resource indication transmission unit 5304, configured to transmit an indication for the second group of configuration resource.

In some embodiments of the present disclosure, the allocated resource indication transmission unit 5303 may further be configured to transmit an indication for resource configurations; and transmit an indication for resources in the resource configurations not to be allocated to the first group of configuration resources and/or the second group of configuration resources.

In some embodiments of the present disclosure, wherein the resources in the allocated resource configurations to be muted may contain predetermined resource elements or a predetermined port configuration. Or alternatively, the apparatus 5300 may further comprise a resource muting indication transmission unit 5305 which is configured to transmit an indication for resource elements or a port configuration to be muted to indicate the unused resources in the allocated resource configurations.

In some embodiments of the present disclosure, the apparatus may further comprise: a zero power configuration indication transmission unit 5306, configured to transmit an indication for zero power configuration to indicate resource elements or a port configuration to be muted in the first group of configuration resources or the second group of configuration resources.

In some embodiments of the present disclosure, an antenna array for transmitting the reference signals is divided to at least a first sub-array and a second sub-array, and wherein one of the first sub-array and the second sub-array is mapped to the first transmission resource group and the other of them is mapped to the second transmission resource group. The antenna array can be divided based on rows and/or columns of antennae in the antenna array. The first sub-array and the second sub-array can be partially overlapped with each other for some reference signal ports.

In some embodiments of the present disclosure, at least one of the first sub-array and the second sub-array can be further divided into a plurality of sub-array groups; and wherein the plurality of sub-array groups are mapped to different configuration resources in respective one of the first group of configuration resources and the second group of configuration resources. The sub-array can be divided based on rows and/or columns of antennae in the antenna array or based on polarization directions of the antennae.

In some embodiments of the present disclosure, the reference signals can be transmitted with a high order orthogonal cover code (OCC) sequence. The high order OCC sequence can include a first sequence part containing legacy OCC sequences and a second sequence part containing extended OCC sequences, wherein configuration resources which can be used by legacy users are multiplexed by using the first sequence part.

Figure 54:
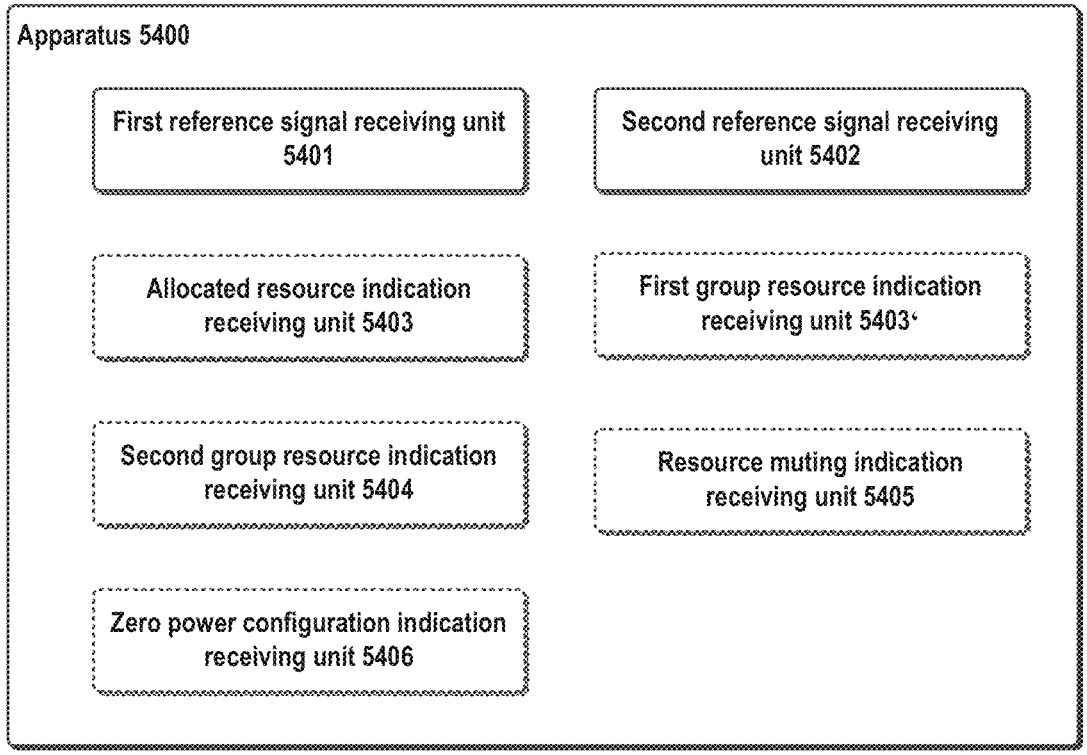
FIG. 54 schematically illustrates a block diagram of an apparatus 5400 for receiving reference signals in accordance with another embodiment of the present disclosure.

FIG. 54 further schematically illustrates an apparatus 5400 for receiving reference signals in accordance with the present disclosure. The apparatus 5400 can be comprised at the terminal device like UE.

As illustrated in FIG. 54, the apparatus 5400 comprises a first reference signal receiving unit 5401 and a second reference signal receiving unit 5402. The first reference signal receiving unit 5401 is configured to receive the reference signals in a first group of configuration resources within a first transmission resource group. The second reference signal receiving unit 5402 is configured to receive the reference signals in a second group of configuration resources within a second transmission resource group. The first group of configuration resources are determined based on allocated resource configurations for the reference signals and the second group of configuration resources are a subset of the 'first group of configuration resources.

In some embodiments of the present disclosure, the first group of configuration resources can be a part of the allocated resource configurations, and resources in the allocated resource configurations unused by the first group of configuration resources and/or the second group of configuration resources are muted.

In some embodiments of the present disclosure, the allocated resource configurations may comprise a combination of legacy resource configurations for reference signals.

In some embodiments of the present disclosure, the second group of configuration resources may contain different configuration resources for two closet transmission resources in the second transmission resource group.

In some embodiments of the present disclosure, the apparatus 5400 may further comprise an allocated resource indication receiving unit 5403, configured to receive an indication for the allocated resource configurations, and wherein the first group of configuration resources are determined based on the allocated resource configurations. Or alternatively, the apparatus 5400 may further comprise a first group resource indication receiving unit 5403', configured to receive an indication for the first group of configuration resources.

In some embodiments of the present disclosure, the apparatus 5400 may further comprise a second group resource indication receiving unit 5404, configured to receive an indication for the second group of configuration resource.

In some embodiments of the present disclosure, the allocated resource indication receiving unit 5403 may be further configured to receive an indication for resource configurations; and receive an indication for resources in the resource configurations not to be allocated to the first group of configuration resources and/or the second group of configuration resources.

In some embodiments of the present disclosure, the resources in the allocated resource configurations to be muted contain predetermined resource elements or a predetermined port configuration. In other embodiments of the present disclosure, the apparatus may further comprise: a resource muting indication receiving unit 5405, configured to receive an indication for resource elements or a port configuration to be muted.

In some embodiments of the present disclosure, the apparatus 5400 may further comprise: a zero power configuration indication receive unit 5406, configured to receive an indication for zero power configuration which indicates resource elements or a port configuration to be muted in the first group of configuration resources or the second group of configuration resources.

In some embodiments of the present disclosure, the reference signals for different layers can be obtained from same configuration resources with a high order orthogonal cover code (OCC) sequence.

In some embodiments of the present disclosure, the high order OCC sequence may include a first sequence part containing legacy OCC sequences and a second sequence part containing extended OCC sequence and wherein the reference signals for different layers on configuration resources which can be used by legacy users are obtained by using the first sequence part.

Hereinbefore, the apparatuses 5300 and 5400 are described in brief with reference to FIGS. 53 to 54. It is noted that the apparatuses 5300 and 5400 may be configured to implement functionalities as described with reference to FIGS. 5 to 52. Therefore, for details about the operations of modules in these apparatuses, one may refer to those descriptions made with respect to the respective steps of the methods with reference to FIGS. 5 to 52.

It is further noted that the components of the apparatuses 5300 and 5400 may be embodied in hardware, software, firmware, and/or any combination thereof. For example, the components of apparatuses 5300 and 5400 may be respectively implemented by a circuit, a processor or any other appropriate selection device. In addition, those skilled in the art will appreciate that the aforesaid examples are only for illustration not for limitation and the present disclosure is not limited thereto; one can readily conceive many variations, additions, deletions and modifications from the teaching provided herein and all these variations, additions, deletions and modifications fall the protection scope of the present disclosure.

Additionally, in some embodiments of the present disclosure, apparatuses 5300 and 5400 may each comprise at least one processor. The at least one processor suitable for use with embodiments of the present disclosure may include, by way of example, both general and special purpose processors already known or developed in the future. Apparatuses 5300 and 5400 may each further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 5300 and 5400 to at least perform operations according to the method as discussed with reference to FIGS. 5 to 52 respectively.

Figure 55:
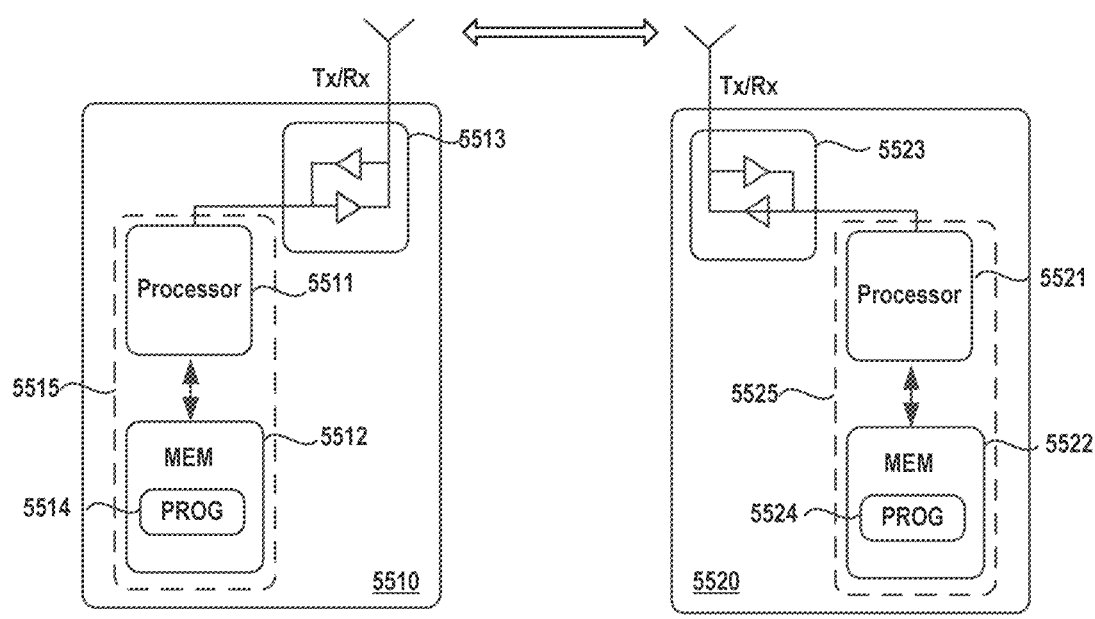
FIG. 55 further illustrates a simplified block diagram of an apparatus 5510 that may be embodied as or comprised in UE and an apparatus 5520 that may be embodied as or comprised in a base station in a wireless network as described herein.

FIG. 55 further illustrates a simplified block diagram of an apparatus 5510 that may be embodied as or comprised in a terminal device such as UE for a wireless network in a wireless network and an apparatus 5520 that may be embodied as or comprised in a base station such as NB or eNB as described herein.

The apparatus 5510 comprises at least one processor 5511, such as a data processor (DP) and at least one memory (MEM) 5512 coupled to the processor 5511. The apparatus 5510 may further comprise a transmitter TX and receiver RX 5513 coupled to the processor 5511, which may be operable to communicatively connect to the apparatus 5520. The MEM 5512 stores a program (PROG) 5514. The PROG 5514 may include instructions that, when executed on the associated processor 5511, enable the apparatus 5510 to operate in accordance with embodiments of the present disclosure, for example to perform the method 5200. A combination of the at least one processor 5511 and the at least one MEM 5512 may form processing means 5515 adapted to implement various embodiments of the present disclosure.

The apparatus 5520 comprises at least one processor 5521, such as a DP, and at least one MEM 5522 coupled to the processor 5521. The apparatus 5520 may further comprise a suitable TX/RX 5523 coupled to the processor 5521, which may be operable for wireless communication with the apparatus 5510. The MEM 5522 stores a PROG 5524. The PROG 5524 may include instructions that, when executed on the associated processor 5521, enable the apparatus 5520 to operate in accordance with the embodiments of the present disclosure, for example to perform the method 500. A combination of the at least one processor 5521 and the at least one MEM 5522 may form processing means 5525 adapted to implement various embodiments of the present disclosure.

Various embodiments of the present disclosure may be implemented by computer program executable by one or more of the processors 5511, 5521, software, firmware, hardware or in a combination thereof.

The MEMs 5512 and 5522 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 5511 and 5521 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a base station, the method comprising:
   signaling to a UE (User Equipment), an RRC (Radio Resource Control) parameter which configures resource for transmission of CSI-RS (Channel State Information Reference Signal), wherein
   the RRC parameter indicates frequency domain locations of a first resource element group and a second resource element group within a unit of 14 symbols in time domain,
   a total number of antenna ports corresponding to the first resource element group and the second resource element group is larger than 16,
   time domain location of the first resource element group and time domain location of the second resource element group are mutually equal,
   the first resource element group and the second resource element group respectively corresponds to two sub-groups of resource configurations,
   time domain locations of resource elements of the two sub-groups are mutually different,
   frequency domain locations of the resource elements of the two sub-groups are mutually equal within the unit of 14 symbols in time domain; and
   transmitting the CSI-RS to the UE, using the resource for transmission of CSI-RS.

2. The method of claim 1, wherein no resource other than the first resource element group and the second resource element group is configured as the resource for transmission of CSI-RS by the RRC parameter.

3. The method of claim 1, wherein each of the sub-groups comprises a bundle of four resource elements, wherein the four resource elements have a relationship expressed as (k, l), (k+1, l), (k, l+1), (k+1, l+1) respectively, wherein k represents an index of a subcarrier and l represents an index of a symbol.

4. The method of claim 3, wherein each of the sub-groups comprises two bundles of the four resource elements.

5. The method of claim 1, wherein the time domain locations of the resource elements of the two sub-groups are mutually non-adjacent.

6. The method of claim 1, wherein the number of resource elements within the first resource element group and the number of resource elements within the second resource element group are equal.

7. A method performed by a UE (User Equipment), the method comprising:
   receiving from a base station, an RRC (Radio Resource Control) parameter which configures resource for transmission of CSI-RS (Channel State Information Reference Signal), wherein
   the RRC parameter indicates frequency domain locations of a first resource element group and a second resource element group within a unit of 14 symbols in time domain,
   a total number of antenna ports corresponding to the first resource element group and the second resource element group is larger than 16,
   time domain location of the first resource element group and time domain location of the second resource element group are mutually equal,
   the first resource element group and the second resource element group respectively corresponds to two sub-groups of resource configurations,
   time domain locations of resource elements of the two sub-groups are mutually different,
   frequency domain locations of the resource elements of the two sub-groups are mutually equal within the unit of 14 symbols in time domain; and
   receiving the CSI-RS from the base station, using the resource for transmission of CSI-RS.

8. The method of claim 7, wherein no resource other than the first resource element group and the second resource element group is configured as the resource for transmission of CSI-RS by the RRC parameter.

9. The method of claim 7, wherein each of the sub-groups comprises a bundle of four resource elements, wherein the four resource elements have a relationship expressed as (k, l), (k+1, l), (k, l+1), (k+1, l+1) respectively, wherein k represents an index of a subcarrier and l represents an index of a symbol.

10. The method of claim 9, wherein each of the sub-groups comprises two bundles of the four resource elements.

11. The method of claim 7, wherein the time domain locations of the resource elements of the two sub-groups are mutually non-adjacent.

12. The method of claim 7, wherein the number of resource elements within the first resource element group and the number of resource elements within the second resource element group are equal.

13. A base station comprising a transmitter configured to:
signal to a UE (User Equipment), an RRC (Radio Resource Control) parameter which configures resource for transmission of CSI-RS (Channel State Information Reference Signal), wherein
the RRC parameter indicates frequency domain locations of a first resource element group and a second resource element group within a unit of 14 symbols in time domain,
a total number of antenna ports corresponding to the first resource element group and the second resource element group is larger than 16,
time domain location of the first resource element group and time domain location of the second resource element group are mutually equal,
the first resource element group and the second resource element group respectively corresponds to two sub-groups of resource configurations,
time domain locations of resource elements of the two sub-groups are mutually different,
frequency domain locations of the resource elements of the two sub-groups are mutually equal within the unit of 14 symbols in time domain; and
transmit the CSI-RS from the base station, using the resource for transmission of CSI-RS.

14. The base station of claim 13, wherein no resource other than the first resource element group and the second resource element group is configured as the resource for transmission of CSI-RS by the RRC parameter.

15. The base station of claim 13, wherein each of the sub-groups comprises a bundle of four resource elements, wherein the four resource elements have a relationship expressed as (k, l), (k+1, l), (k, l+1), (k+1, l+1) respectively, wherein k represents an index of a subcarrier and l represents an index of a symbol.

16. The base station of claim 15, wherein each of the sub-groups comprises two bundles of the four resource elements.

17. The base station of claim 13, wherein the time domain locations of the resource elements of the two sub-groups are mutually non-adjacent.

18. The base station of claim 13, wherein the number of resource elements within the first resource element group and the number of resource elements within the second resource element group are equal.

* * * * *